(12) United States Patent
Visvanathan et al.

(10) Patent No.: US 10,936,412 B1
(45) Date of Patent: Mar. 2, 2021

(54) METHOD AND SYSTEM FOR ACCESSING DATA STORED IN DATA CACHE WITH FAULT TOLERANCE

(71) Applicant: EMC IP Holding Company LLC, Hopkinton, MA (US)

(72) Inventors: Satish Visvanathan, San Jose, CA (US); Rahul B. Ugale, Santa Clara, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 220 days.

(21) Appl. No.: 15/489,011

(22) Filed: Apr. 17, 2017

(51) Int. Cl.
| | |
|---|---|
| G06F 11/00 | (2006.01) |
| G06F 11/10 | (2006.01) |
| G06F 3/06 | (2006.01) |
| G06F 11/20 | (2006.01) |

(52) U.S. Cl.
CPC ......... *G06F 11/1064* (2013.01); *G06F 3/064* (2013.01); *G06F 3/065* (2013.01); *G06F 3/0619* (2013.01); *G06F 3/0688* (2013.01); *G06F 11/2017* (2013.01); *G06F 2201/85* (2013.01)

(58) Field of Classification Search
CPC . G06F 11/1064; G06F 11/2017; G06F 3/0619
See application file for complete search history.

(56) References Cited

U.S. PATENT DOCUMENTS

| | | | |
|---|---|---|---|
| 5,418,921 A * | 5/1995 | Cortney | G06F 11/1008 711/113 |
| 6,928,526 B1 | 8/2005 | Zhu et al. | |
| 8,156,392 B2 * | 4/2012 | Flynn | G06F 11/006 365/185.01 |
| 8,321,630 B1 * | 11/2012 | Vaid | G06F 12/0871 711/104 |
| 8,396,839 B1 | 3/2013 | Huang | |
| 8,751,725 B1 | 6/2014 | Gangadharan et al. | |
| 8,836,548 B1 * | 9/2014 | Chandra | H03M 7/607 341/60 |
| 9,304,914 B1 | 4/2016 | Douglis et al. | |
| 9,424,185 B1 * | 8/2016 | Botelho | G06F 12/0253 |
| 9,582,421 B1 | 2/2017 | Agarwala et al. | |
| 2004/0196707 A1 * | 10/2004 | Yoon | G11C 29/76 365/200 |
| 2012/0089775 A1 | 4/2012 | Ranade et al. | |
| 2012/0102009 A1 | 4/2012 | Peterson et al. | |

(Continued)

*Primary Examiner* — Philip Guyton
(74) *Attorney, Agent, or Firm* — Womble Bond Dickinson (US) LLP

(57) ABSTRACT

According to some embodiments, a backup storage system receives a request from a client to access a data segment. The system looks up an in-memory index for a first entry based on a fingerprint of the data segment, such that the in-memory index includes a number of entries, each entry mapping a fingerprint to a storage location of a solid state device (SSD) storing a corresponding data segment. In the event a first entry is found, the system retrieves the data segment from the SSD device based on the first entry. In the event of a read failure while accessing the SSD device, the system determines failed data blocks of the SSD device associated with the failure event and invalidates the failed data blocks of the SSD device such that subsequent access to the failed data blocks are denied without having to access a corresponding SSD device.

18 Claims, 18 Drawing Sheets

(56) References Cited

U.S. PATENT DOCUMENTS

| | | |
|---|---|---|
| 2013/0243190 A1 | 9/2013 | Yang et al. |
| 2013/0346672 A1 | 12/2013 | Sengupta et al. |
| 2014/0380092 A1 | 12/2014 | Kim et al. |
| 2016/0041778 A1 | 2/2016 | Li et al. |
| 2016/0224415 A1* | 8/2016 | Yoshida .............. G06F 11/1064 |
| 2017/0206022 A1 | 7/2017 | Theinert |

* cited by examiner

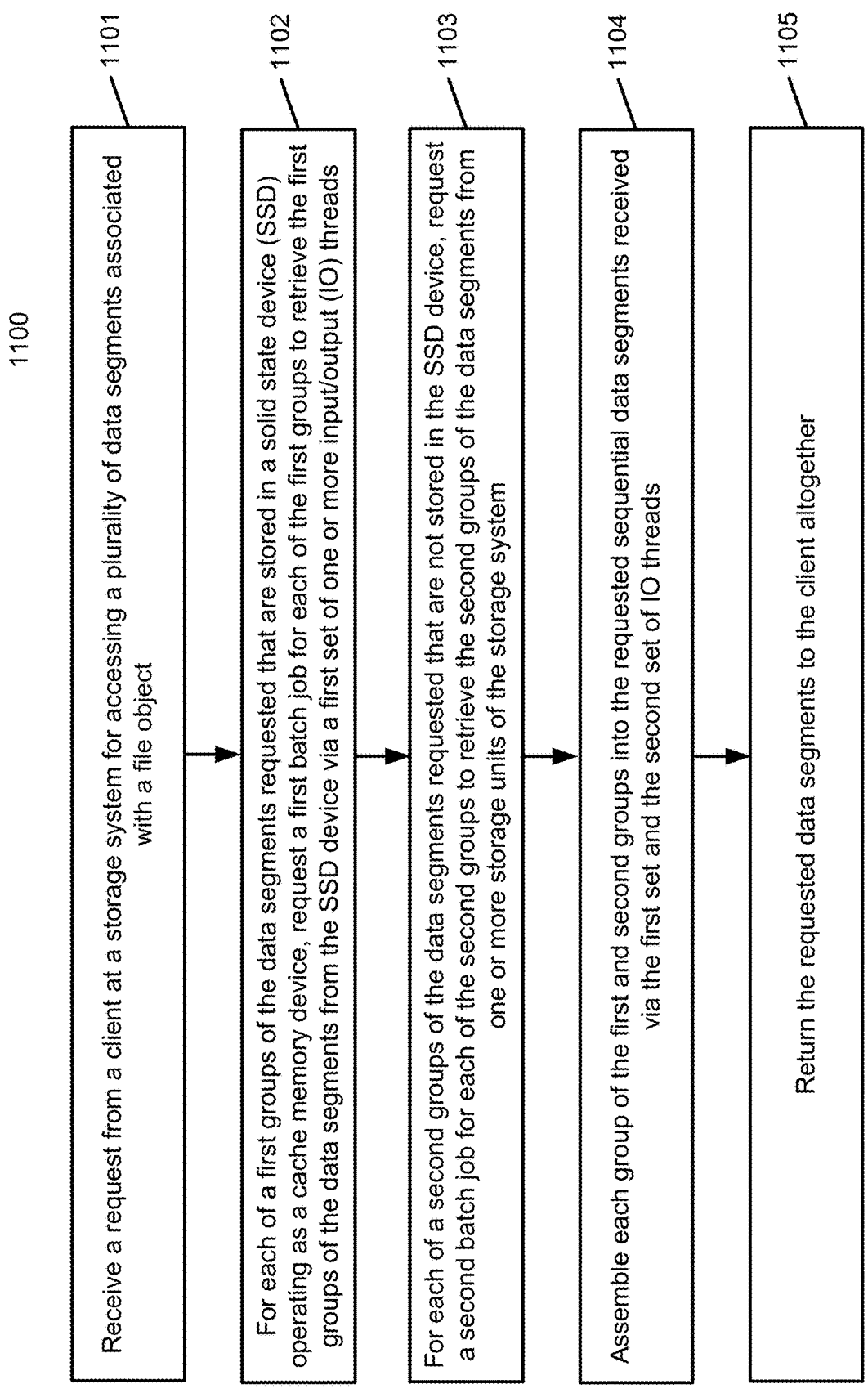

METHOD AND SYSTEM FOR ACCESSING DATA STORED IN DATA CACHE WITH FAULT TOLERANCE

RELATED APPLICATIONS

This application is related to co-pending U.S. patent application Ser. No. 15/488,977, entitled "Method to Provide Sustained IOPS with Data Cache on Constrained Systems," filed Apr. 17, 2017, co-pending U.S. patent application Ser. No. 15/488,999, entitled "Method for Efficient Write Path Cache Load to Improve Storage Efficiency," filed Apr. 17, 2017, and co-pending U.S. patent application Ser. No. 15/489,003, entitled "Method for Pipelined Read Optimization to Improve Performance of Reading Data from Data Cache and Storage Units," filed Apr. 17, 2017. The disclosure of the above applications is incorporated by reference herein in its entirety.

FIELD OF THE INVENTION

Embodiments of the present invention relate generally to data storage systems. More particularly, embodiments of the invention relate to method and system for accessing data stored in data cache with fault tolerance.

BACKGROUND

Though there are numerous media options, the classic storage hierarchy is often described as hard disk drives (HDDs) providing slow, persistent storage and dynamic random access memory (DRAM) situated closer to processors providing fast, volatile storage. Flash-based solid state devices (SSDs) became available with latency and price between DRAM and HDD, though with limited endurance.

Traditional computer architectures include primary storage systems and backup (data recovery) storage systems. Typically when a primary system fails, data from storage system is replicated to the primary system. While replicating, it may be desirable to simultaneously access data directly, i.e., random access, from the storage system. Because of long latency of accessing a storage system randomly, it is desirable to integrate SSDs as a caching layer in backup storage systems for improved performances.

A challenge is to build a backup storage system with a SSD cache layer balancing cost and performance. Because SSD has limited number write-erase cycles, another challenge is to limit write-erase cycles (churn) of the SSD cache to improve the useful life span of SSD devices. Yet, another challenge is to improve read access latency when retrieving data from both hard drives and SSD drives simultaneously. Yet another challenge is to improve fault tolerance of a SSD data cache layer.

BRIEF DESCRIPTION OF THE DRAWINGS

Embodiments of the invention are illustrated by way of example and not limitation in the figures of the accompanying drawings in which like references indicate similar elements.

FIG. 11 is a flow diagram illustrating an overview of a method to retrieve data segments in parallel from a SSD data cache and from persistent storage units of a storage system according to one embodiment of the invention.

DETAILED DESCRIPTION

Figure 1:
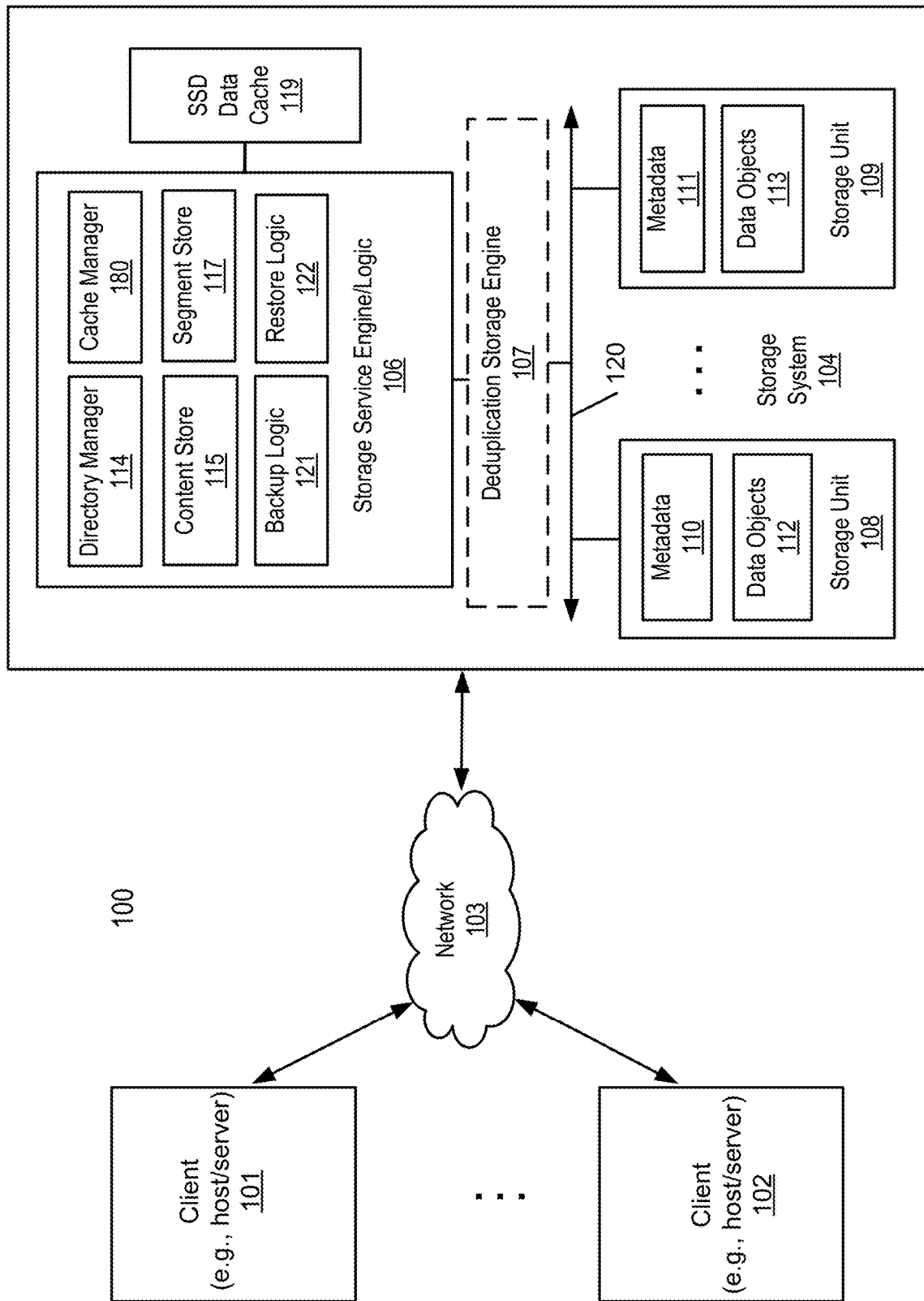
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Random access refers to access (read/write) to a random offset of a file at least once during a read/write input/output operation.

According to one aspect of the invention, a storage system may integrate solid state devices (SSD) as a caching layer for better random access performance in comparison with a storage system having only traditional spinning drives (e.g., traditional magnetic rotating disks). For example, SSDs can deliver about 500× more input/output operations per second (IOPS) than spinning drives but also have 5× the cost. SSDs, as well as other forms of flash memory, however, have a limited number of write-erase cycles after which a given region of memory cannot be rewritten. When data is accessed, the storage system receives a request from a client for reading a data segment associated with a file object stored in the storage system. In response to the request, the system performs a lookup operation in a first index stored in a memory (e.g., DRAM) to identify a first index entry based on a fingerprint of the requested data segment to obtain a first write-evict unit (WEU) identifier (ID) identifying a first WEU storing the requested data segment. The system accesses an SSD device operating as a cache memory device to retrieve the data segment from the first WEU. The system extracts and decompresses a compressed data segment retrieved from the first WEU and returns the decompressed data segment to the client without accessing a storage unit for retrieving the same data segment.

According to another aspect of the invention, a storage system receives a request from a client for writing a data segment associated with a file object stored to the storage system. In response to the request, the system writes the data segment to one of many storage units of the storage system. The system determines whether the data segment is associated with a file region of the file object that is frequently accessed. The system writes the data segment in a first of many of WEUs stored in an SSD device operating as a cache memory device for caching data, after it is determined that the data segment is associated with the frequently accessed file region.

According to another aspect of the invention, a storage system receives a request from a client for accessing a number of data segments associated with a file object. For each of a first groups of the data segments requested that are stored in an SSD device operating as a cache memory device, the system requests a first batch job for each of the first groups to retrieve the first groups of the data segments from the SSD device via a first set of one or more input/output (IO) threads. For each of a second groups of the data segments requested that are not stored in the SSD device, the system requests a second batch job for each of the second groups to retrieve the second groups of the data segments from one or more storage units of the storage system. The system assembles each group of the first and second groups into the requested sequential data segments received via the first set and the second set of IO threads and returns the requested data segments to the client altogether.

According to another aspect of the invention, a storage system receives a request from a client to access a data segment associated with a file object of the storage system. The system looks up an in-memory index for a first entry based on a fingerprint of the data segment. The in-memory index includes a number of entries, each entry mapping a fingerprint to a storage location of an SSD device storing a corresponding data segment. In the event a first entry is found, the system retrieves the data segment from the SSD device based on the first entry. In the event of a read failure while accessing the SSD device, the system determines one or more failed data blocks of the SSD device associated with the failure event and invalidates the failed data blocks of the SSD device such that subsequent access to the failed data blocks are denied without having to access a corresponding SSD device.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include directory manager 114, content store 115, segment store 117, optional backup logic 121, optional restore logic 122, and cache manager 180. Backup logic 121 is configured to receive and back up data from a client (e.g., clients 101-102)

and to store the backup data in any one or more of storage units 108-109. Restore logic 122 is configured to retrieve and restore backup data from any one or more of storage units 108-109 back to a client (e.g., clients 101-102). Directory manager 114 is configured to manage files stored in a file system of the storage system. Content store 115 may be configured to receive file segments requests from directory manager 114 and to retrieve the file segments from storage units 108-109 (via segment store 117) and/or SSD data cache 119. Segment store 117 may be configured to store and retrieve deduplicated segments to and from storage units 108-109. In another embodiment, segment store 117 includes deduplication storage engine 107 (not shown) and deduplicates file segments prior to storing the segments in storage units 108-109. Cache manager 180 is configured to manage access of a cache memory device, such as SSD device 119 operating as a cache memory device with respect to storage units 108-109.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication storage engine or deduplication logic 107 is configured to segment the data file into multiple segments (also referred to as chunks) according to a variety of segmentation policies or rules. Deduplication storage engine 107 may be implemented as part of content store 115 and/or segment store 117. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2:
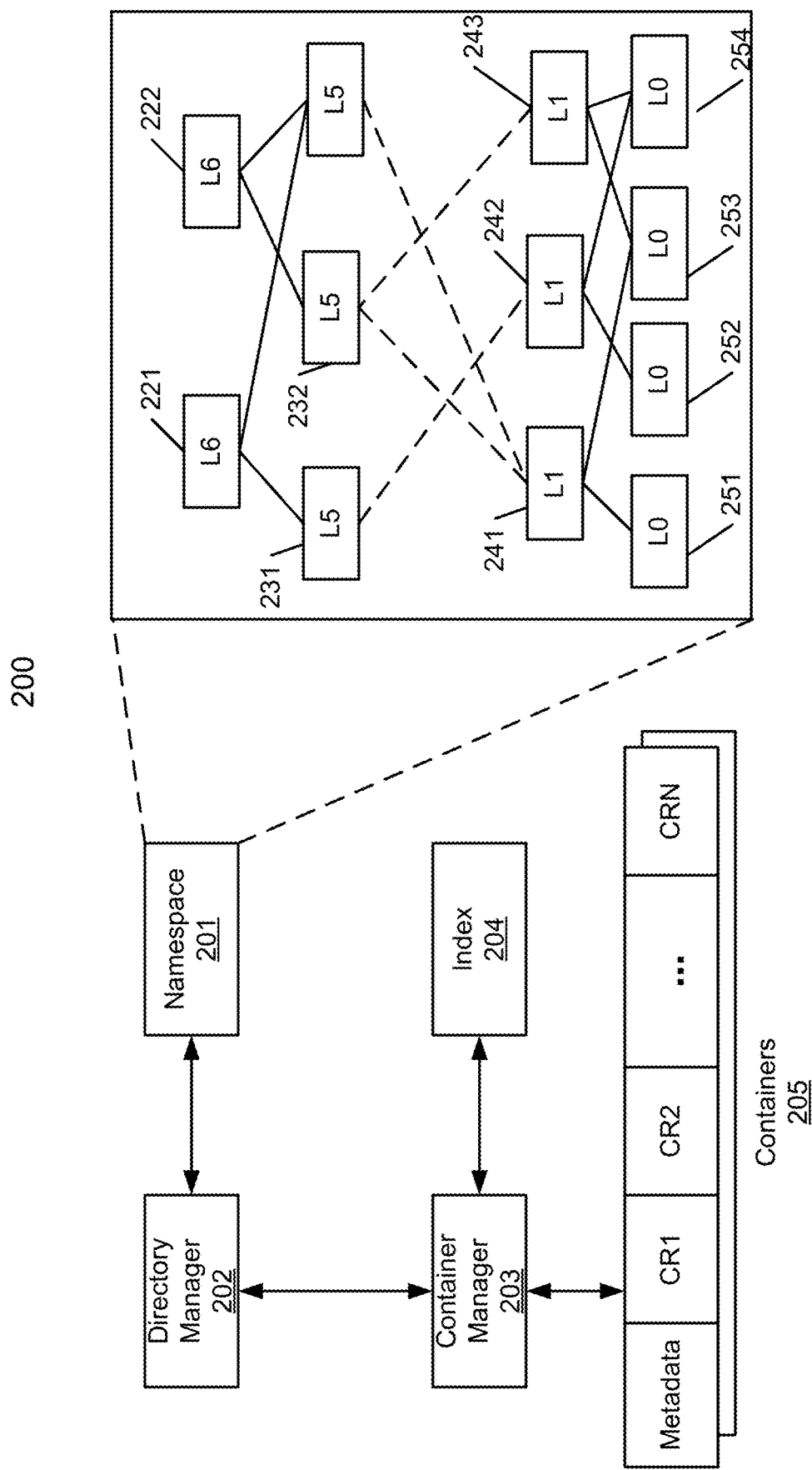
FIG. 2 is a block diagram illustrating an example of a Merkle tree file structure according to one embodiment of the invention.

FIG. 2 is a block diagram illustrating a storage system according to one embodiment of the invention. System 200 may be implemented as part of storage system 104 of FIG. 1. Referring to FIG. 2, system 200 traverses namespace 201 via directory manager 202, where directory manager 202 is configured to manage files stored in a file system of the storage system. In a deduplicated file system, a file may be represented in a file tree having one or more levels of segments in a multi-level hierarchy. In this example, there are seven levels L0 to L6, where L6 is the root level, also referred to as a top parent level. More or fewer levels may be applied herein. Each upper level contains one or more references to one or more lower level segments. In one embodiment, an upper level segment contains a fingerprint (e.g., metadata) of fingerprints of its child level segments. Only the lowest level segments (e.g., L0 segments) are the actual data segments containing the actual deduplicated segments. Thus, L1 to L6 are segments only contain metadata of their respective child segments(s), referred to herein as Lp segments.

In one embodiment, when system 200 traverses namespace 201 via directory manager 202, it obtains the fingerprints of the root level segments, in this example, L6 segments, as part of content handles from namespace 201. Based on the fingerprints of the current level segments, container manager 203 can identify which of the containers 205 in which the segments are stored based on indexing information from index 204. Index 204 may be maintained in the system memory (e.g., volatile memory) and/or in a storage device (e.g., non-volatile memory). Index 204 includes information mapping a fingerprint to a storage location that stores a segment represented by the fingerprint. In one embodiment, index 204 may be a fingerprint-to-container identifier (FP/CID) index that maps a particular fingerprint to a container that contains the corresponding segment or a compression region (CR) having the segment stored therein.

The metadata (e.g., fingerprints) and the data section of the current level segments can be obtained from the identified container. A container may contain metadata or fingerprints of all segments stored therein, where segments are compressed into a compression region. A segment can be obtained by retrieving the entire container or the corresponding compression region from the storage device or disk. Based on the metadata or the data section of a current level segment, its child segment or segments can be identified, and so on. Throughout this application, for the purpose of illustration, a container contains one or more compression regions and each compression region contains one or more segments therein. However, the techniques may also be applied to other storage layouts.

Referring back to FIG. 2, in one embodiment, there are two components responsible to manage the files in the system. The first one is directory manager 202, which is a hierarchical mapping from the path to the inode representing a file. The second one is a content store, such as content store 115, which manages the content of the file. Each file has a content handle (CH) that is stored in the inode that is created by content store every time the file content changes. Each CH represents a file that is abstracted as a file tree (e.g., a Merkle tree or Mtree) of segments. In this example, a file tree can have up to 7 levels: L0, . . . , L6. The L0 segments represent user data (e.g., actual data) and are the leaves of the tree. The L6 is the root of the segment tree. Segments from L1 to L6 are referred to as metadata segments or Lp segments. They represent the metadata of the file. An L1 segment is an array of L0 references. Similarly an L2 is an array of L1 references and so on. A segment is considered live if it can be referenced by any live content in the file system.

The file system packs the segments into containers 205 which are written to a disk in a log-structured manner. The log-structured container set has a log tail and a log head. New containers are always appended at the head of the log. Each container is structured into sections. The first section is the metadata section and the following sections are compression regions. A compression region is a set of compressed segments. In the metadata section all the references or fingerprints that identify the segments in the container. The metadata further includes information identifying a content type, which describes the content of the container. For instance, it describes which compression algorithm has been used, which type of segments the container has (L0, .

. . . , L6), etc. Container manager 203 is responsible to maintain the log-structured container set and provide a mapping from container identifiers (CID) to block offset on disk. This mapping may be maintained in memory. It also contains additional information, e.g., the content type of each container.

In the example as shown in FIG. 2, segment 221 includes a fingerprint of fingerprints of segments 231 and 233, and segment 222 includes a representation (e.g., a fingerprint) of fingerprints of segments 232-233, and so on. Some of the segments, such as segment 233, are referenced shared by multiple parent level segments (e.g., segments 221-222). Thus, segments 221-222, 231-233, and 241-243 only contain data representing the metadata of their respective child segments. Only segments 251-254 contain the actual user data.

Figure 3:
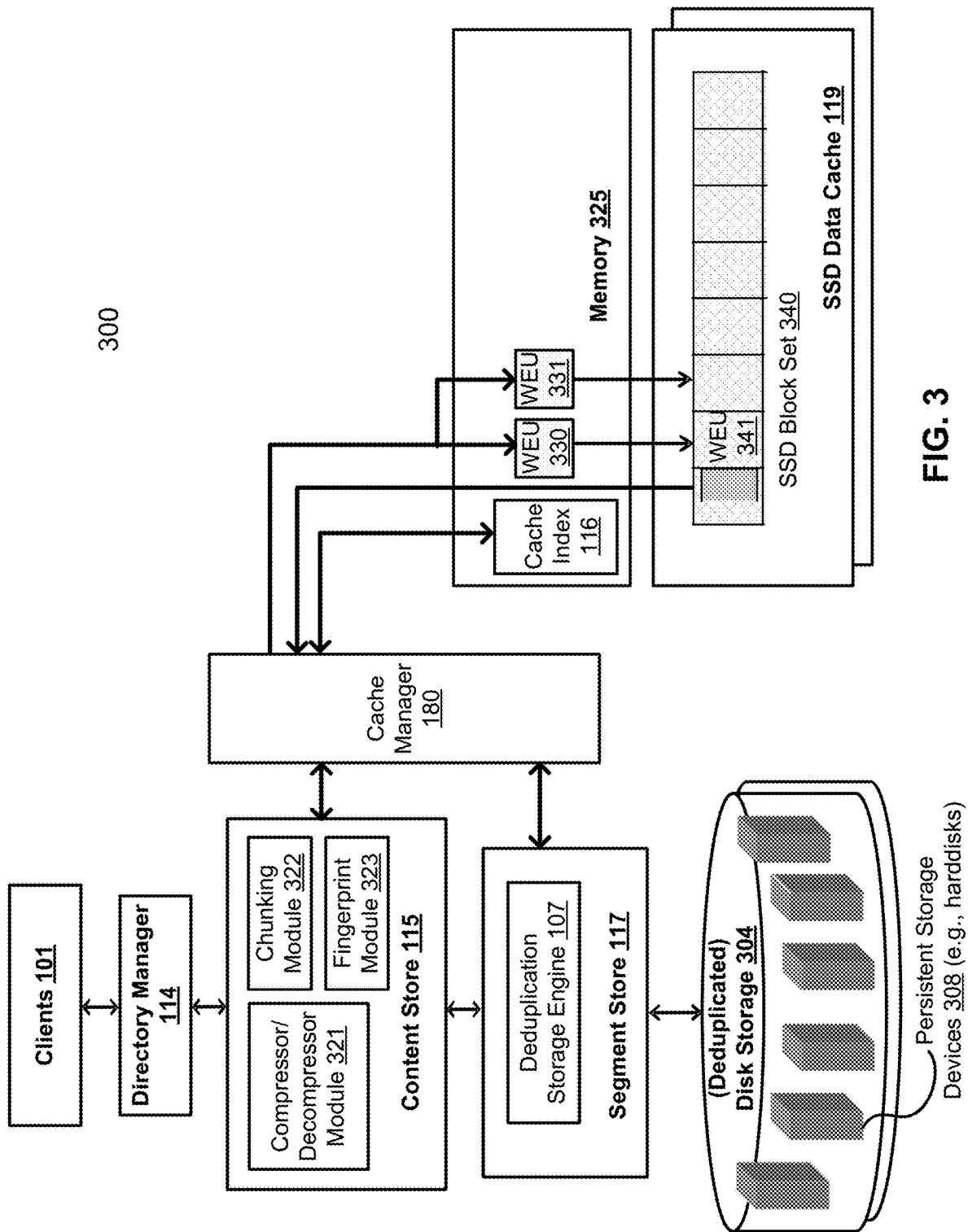
FIG. 3 is a block diagram illustrating example architecture of a storage system according to one embodiment of the invention.

FIG. 3 is a block diagram illustrating example architecture of a storage system according to one embodiment of the invention. System 300 may be implemented as a part of storage system 104 of FIG. 1. Referring to FIG. 3, storage system 300 includes, but is not limited to, one or more clients 101 communicatively coupled to directory manager 114 over a network (not shown). Directory manager 114 is communicatively coupled to content store 115. Directory manager 114 may be executed by a processor to provide a client interface to access files, via file handles, from the storage system. In addition, cache manager 180 is coupled to content store 115 and segment store 117 for accessing one or more SSD devices of SSD data cache 119.

At the bottom of FIG. 3 is disk storage 304 for storage of data. Disk storage 304 may be deduplicated and partitioned into containers (not shown). Each container may be made up of multiples of persistent storage devices 308, which may be implemented by spinning hard drives for a large capacity. Disk storage 304 may also contain file recipes, including file handles, fingerprints of data, and fingerprints of metadata such as nodes of a Merkle tree. Disk storage 304 may be one or more storage units 108-109 of storage system 104 of FIG. 1.

SSD data cache or cache 119 is a persistent cache memory device (such as a solid state device, SSD or flash memory), or simply referred to as cache, to accelerate performance. In cache 119, data are stored and evicted using a basic data structure referred to as a write-evict unit (WEU), such as WEU 341 of FIG. 3. WEU is a data unit that is written, erased, and/or evicted as a whole unit into and from SSD data cache 119. Content store 115 is configured to evict, via cache manager 180, WEUs no longer needed and free space to cache WEUs for new requests. The need of a WEU stems from the fact that cache 119 has limitations different from spinning hard disks, for example, a SSD storage unit must be explicitly erased before being overwritten, and the unit of erasure (up to MB(s) in size) is much larger than the unit of individual writes in disk storage (e.g., 4 kilobytes). In addition, writes wear out the SSD storage over time; therefore, less frequent write is more desirable. Here, a WEU unit may be configured to match a erasure unit of SSD devices of cache 119.

Furthermore, WEU as its basic data structure may be different from data structures such as chunks used in containers of the underlying disk storage 304. WEU is formed by multiple (and compressed) file extents or segments, which may be comprised of fixed-size blocks representing consecutive bytes (often many kilobytes) according to one embodiment of the invention. The consecutive bytes are within a single file in one embodiment. Extents may be the same as or different from file chunks depending on implementation. An extent may be an access unit size (the unit of read from the cache) that is performed by cache 119 in response to a request to access a file block of a file. A block (also referred to as a file block) is a data unit of each IO request to read or write to the underlying storage system. In this example, data requested by a higher file system layer (such as NFS) is in the form of block requests, which are converted to extent requests in the cache, while data being written in cache 119 is in a form of a WEU. A WEU, such as WEU 341, includes multiple extents, each of which is compressed therein where each extent can be independently read and accessed to satisfy read requests from the higher layers of the file system. The size of a WEU may be configured to match an erasure unit size of cache 119, which depends upon the specification or characteristics of cache 119. As a result, the lifespan of the cache 119 can be improved.

Memory 225 may be part of system memory of a storage system such as storage system 104 of FIG. 1. Memory 225 may be dynamic RAM (DRAM) or non-volatile RAM (NVRAM) or a combination thereof in one embodiment. Memory 225 contains cache index 116, which interacts with content store 115 (to index Merkle tree segments stored in cache 119 by storing portions of fingerprints of these segments in cache index 116) to accelerate reading from and writing data to cache 119. Cache index 116 interacts with WEUs 330-331 and WEU 341 for caching file extents in and evicting from cache 119 to accelerate system performance.

Segment store 117 may be part of storage service engine/logic of storage system 104, such as storage logic 106 of storage system 104 of FIG. 1. Segment store 117 may contain deduplication storage engine 107 in one embodiment. Segment store 117 interacts with content store 115 to store/retrieve data segments/chunks to/from disk storage 304. Segment store 117 may interact with memory 325 to store data segments that is retrieved from disk storage 304 to SSD data cache 119 for subsequent access.

Content store 115 may be part of storage service engine/logic of storage system 104, such as storage logic 106 of storage system 104 of FIG. 1. Content store 115 includes compressor/decompressor module 321, chunking module 322, and fingerprint module 323 in one embodiment. Content store 115 interacts with segment store 117, memory 325, cache 119, and directory manager 114 in one embodiment. For example, when data, such as a file, is read by a client, content store 115 receives a data segments read request via directory manager 114. Content store 115 may identify fingerprints associated with the file segments by traversing a file Merkle tree. In another embodiment, directory manager 114 traverses a file Merkle tree to identify the fingerprints. Content store 115 looks up cache index 116 from memory 325 to identify an index entry based on the fingerprints to obtain information about previously stored segments. An index entry may include information such as WEU identifier, physical offset, and content type L0/LP, associated with the physical location of the WEU storing the requested data segment. Content store 115 accesses cache 119 via cache manager 180 to retrieve a compressed data segment based on index entry information. Content store 115 extracts and decompresses the compressed data segment and returns the data segment to the client without accessing disk storage 304.

In one embodiment, in response to determining that a cache index entry does not exist in cache index 116, content store 115 looks up in a second index (not shown), such as index 204 of FIG. 2, based on the fingerprint of the requested data segment to identify a container ID identifying a container storing the requested data segment in disk storage 304 (i.e., one or more storage units 108-109 of FIG. 1). The second index may be stored in memory 325 or in disk storage 304. Content store 115 retrieves compressed data segment via segment store 117 from an identified container of a storage unit, decompresses, and returns the retrieved data segment to the client.

In addition, the retrieved decompressed data segment is further divided into segments for storage via chunking module 322. Compressor/decompressor module 321 of content store 115 compresses the segments and content store 115 stores them into one or more WEUs, such as WEUs 330-331. WEUs 330-331 are then cached via cache manager 180 into SSD data cache 119. Content store 115 subsequently updates cache index 116 by inserting a new entry in cache index 116 to map the fingerprint of the data segment to one or more WEU IDs (e.g., WEUs 330-331) of WEUs to be stored in SSD data cache 119.

In one embodiment, cache index 116 includes a number of index entries, each entry corresponds to one of a number of segments stored in cache 119. Each entry of cache index 116 contains a fingerprint of the underlying segment or a portion thereof, and at least the information to map the fingerprint to a physical storage location of a corresponding WEU in the SSD device, i.e., physical block or WEU ID, and a physical offset.

In one embodiment, index 204 of FIG. 2 includes a number of index entries, each entry mapping a fingerprint of a corresponding data segment to a container ID identifying a container of the storage unit storing the corresponding data segment, i.e., container ID of one or more containers of disk storage 304 storing a corresponding data segment. In one embodiment, cache 119 stores a number of WEUs, such as WEU 341, such that the WEUs are written, erased, and/or evicted as a whole unit into and from cache 119 altogether.

Figure 4:
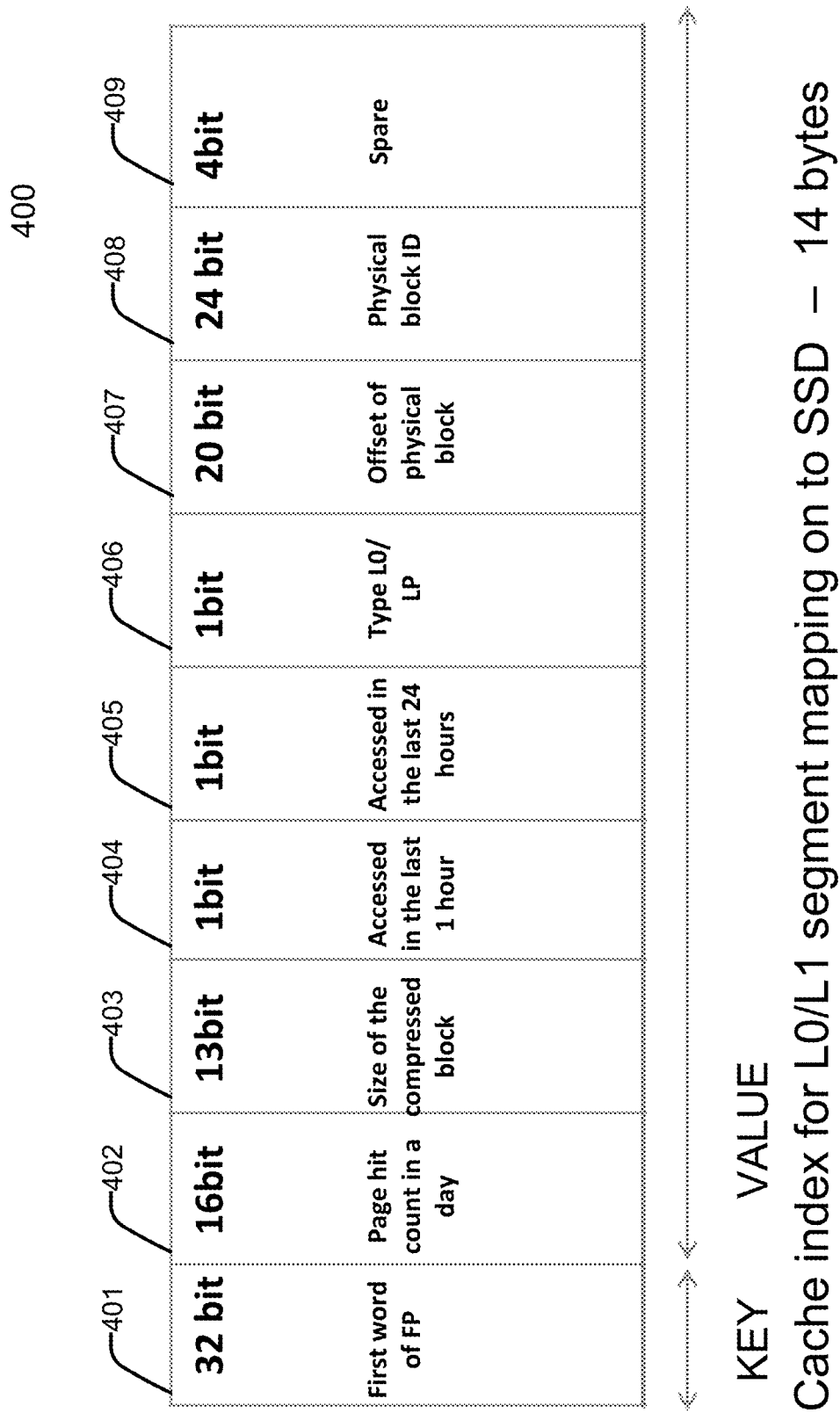
FIG. 4 is a block diagram illustrating an example of a cache index according to one embodiment of the invention.

FIG. 4 is a block diagram illustrating an example data structure of a cache index 400 according to one embodiment of the invention. Cache index 400 may be cache index 116 of FIG. 3 mapping data segments onto SSD data cache 119 of FIG. 3. Referring to FIG. 4, each entry of cache index 400 may be a key-value pair containing 14 bytes of data. Block 401 is a key identifying a key-value pair. Block 401 is a 32-bit entry identifying a first word of a five word fingerprint (such as a SHA1 fingerprint). Note that block 401 could identify any word of the fingerprint for indexing. Blocks 402-408 are values of a key-value pair. Block 402 identifies a 16-bit page hit count. Block 402 may be incremented on every lookup of the entry for the associated segment. Block 402 may be reset every 24 hours. Block 403 is a 13-bit entry storing the size of the compressed block. Block 403 can identify segments up to 8 KB size. Block 404/405 is a 1-bit entry identifying whether the associated segment in cache 119 is accessed in the last 1 hr/24 hr. Blocks 402, 404/405 may be useful statistics for an eviction mechanism of the segment of SSD data cache 119. Block 406 is a 1-bit entry identifying the type of segment, either an L0 segment or LP segment. Block 407 is a 20-bit entry identifying the offset in a physical block (WEU). Block 408 is a 24-bit entry identifying the physical block ID or WEU ID. Block 408 is a 4-bit spare. Although FIG. 4 illustrates an example data structure of cache index 400 with 14 bytes, cache index 400 may be any suitable size. Similarly, blocks of cache index 400 may be arranged in any orders and/or sizes.

In one embodiment, content store 115 receives a segment read request having a fingerprint. Content store 115 looks up an entry from index 116 for an entry such as index 400. Content store looks up a first word of read request fingerprint with block 401 of cache index. When an entry is found, content store 115 determines whether the segment request is for a L0 or LP segment by block 406. Content store 115 determines a WEU ID and an offset of physical block to retrieve the requested segment, from blocks 407-408 of FIG. 4. If the segment is a L0, content store 115 retrieves the segment from cache 119, double checks with a metadata of the segment to verify the fingerprint match, and returns the segment to requesting client. If the segment is an LP segment, content store 115 determines a Merkle tree child of the LP segment, via a fingerprint, and looks up a second index entry, such as cache index 400, to retrieve the underlying L0 segment and returns the segment to the requesting client.

Figure 5A:
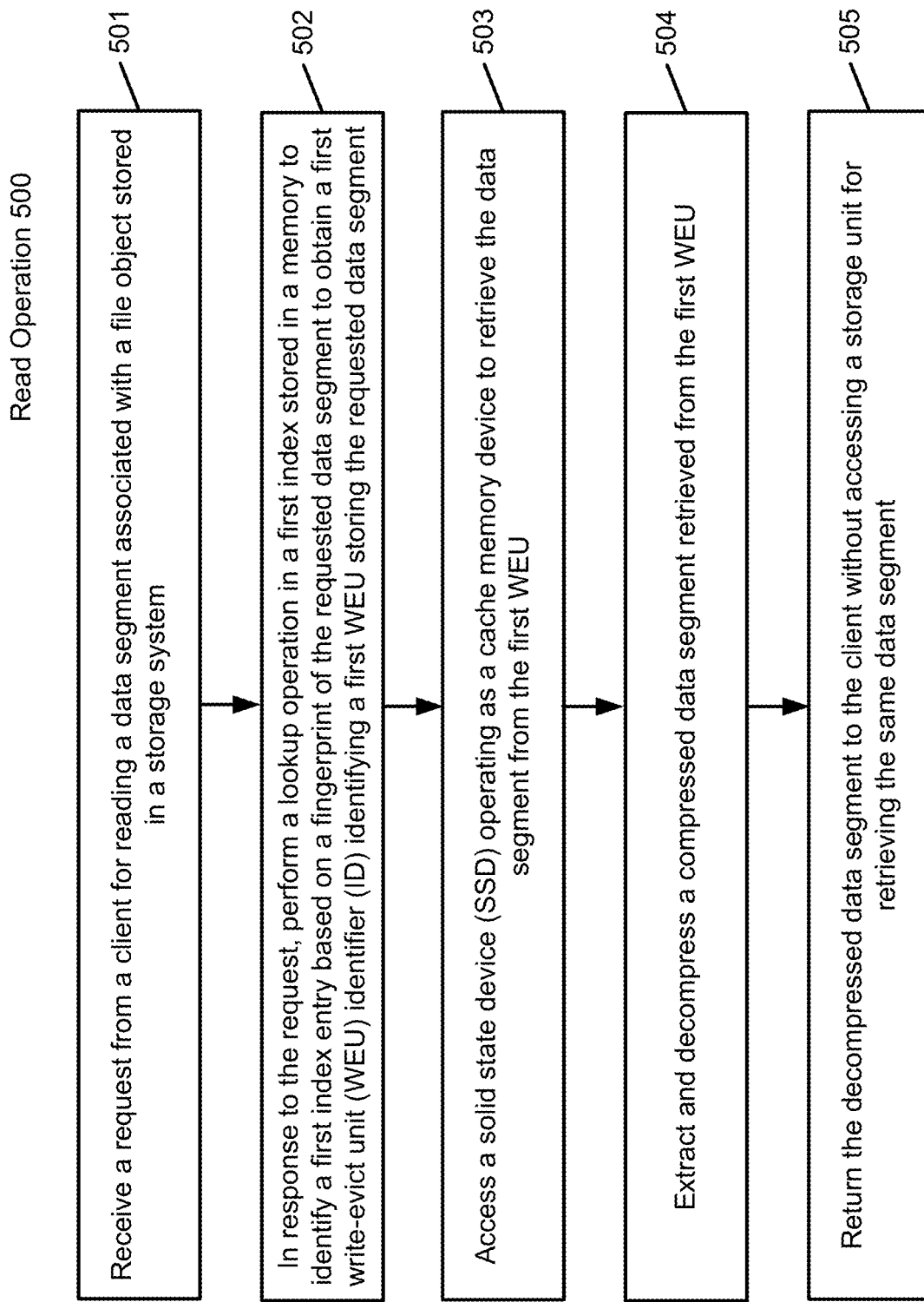
FIG. 5A is a flow diagram illustrating an overview of a method to retrieve data segments from a data cache of a storage system according to one embodiment of the invention.

FIG. 5A is a flow diagram illustrating a process of accessing data segments of a storage system according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by content store 114 of FIG. 3. Referring to FIG. 5A, at block 501, processing logic receives a request from a client for reading a data segment associated with a file object stored in a storage system. At block 502, in response to the request, processing logic performs a lookup operation in a first index stored in a memory to identify a first index entry based on a fingerprint of the requested data segment to obtain a first write-evict unit (WEU) identifier (ID) identifying a first WEU storing the requested data segment. At block 503, processing logic accesses a solid state device (SSD) operating as a cache memory device to retrieve the data segment from the first WEU. At block 504, processing logic extracts and decompresses a compressed data segment retrieved from the first WEU. At block 505, processing logic returns the decompressed data segment to the client without accessing a storage unit for retrieving the same data segment.

Figure 5B:
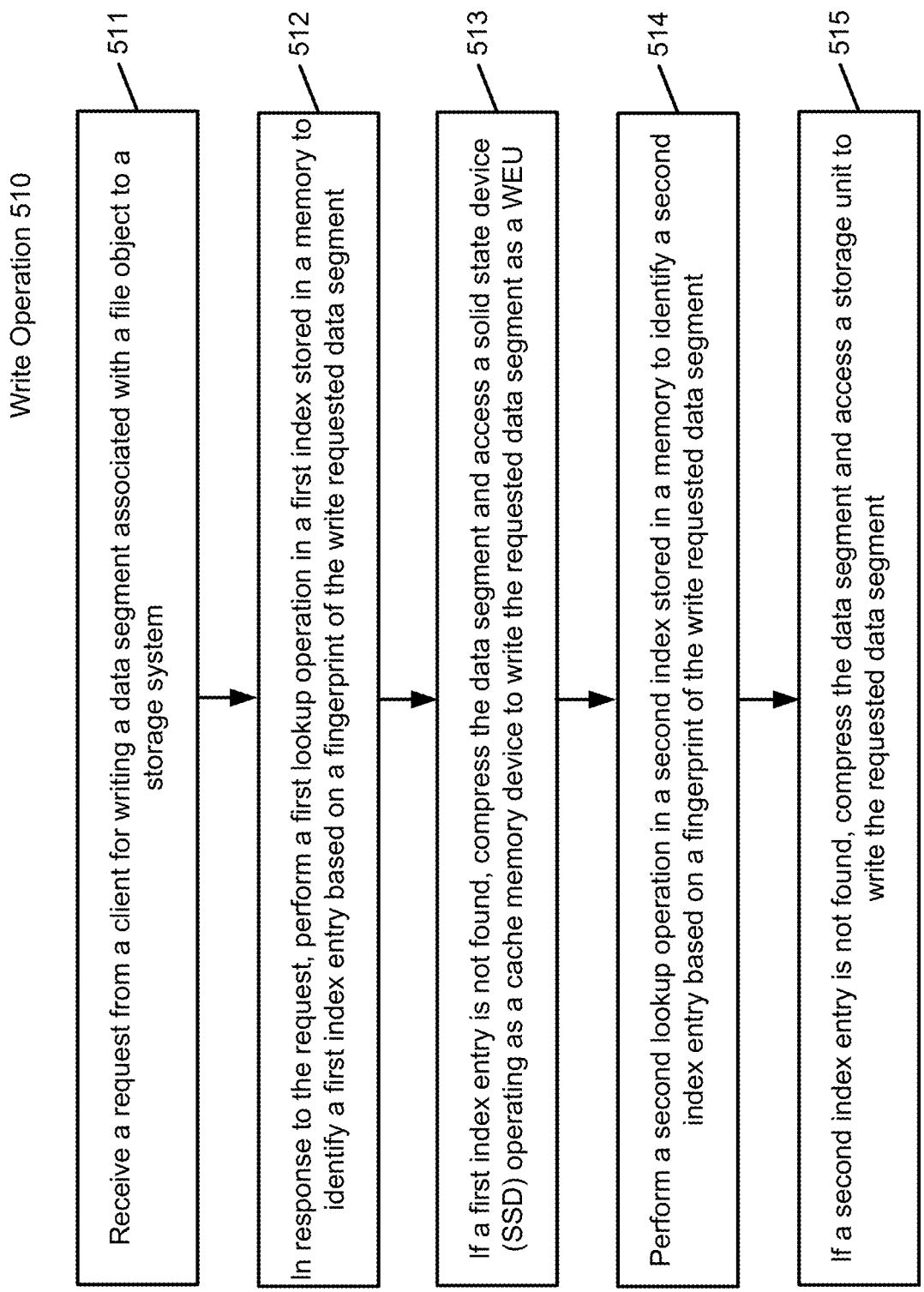
FIG. 5B is a flow diagram illustrating an overview of a method to write data segments to a data cache of a storage system according to one embodiment of the invention.

FIG. 5B is a flow diagram illustrating an overview of a method to write data segments to a data cache of a storage system according to one embodiment of the invention. Process 510 may be performed by processing logic that includes hardware (e.g. circuitry, dedicated logic, etc.), software (e.g., embodied on a non-transitory computer readable medium), or a combination thereof. For example, process 510 may be performed by content store 114 of FIG. 3. Referring to FIG. 5B, at block 511, processing logic receives a request from a client for writing a data segment associated with a file object to a storage system. At block 512, in response to the request, processing logic performs a first lookup operation in a first index stored in a memory to identify a first index entry based on a fingerprint of the write requested data segment. At block 513, if a first index entry is not found, processing logic compresses the data segment and accesses a solid state device (SSD) operating as a cache memory device to write the requested data segment as a WEU. At block 514, processing logic performs a second lookup operation in a second index stored in a memory to identify a second index entry based on a fingerprint of the write requested data segment. At block 515, if a second index entry is not found, processing logic compresses the data segment and accesses a storage unit to write the requested data segment.

Figure 6:
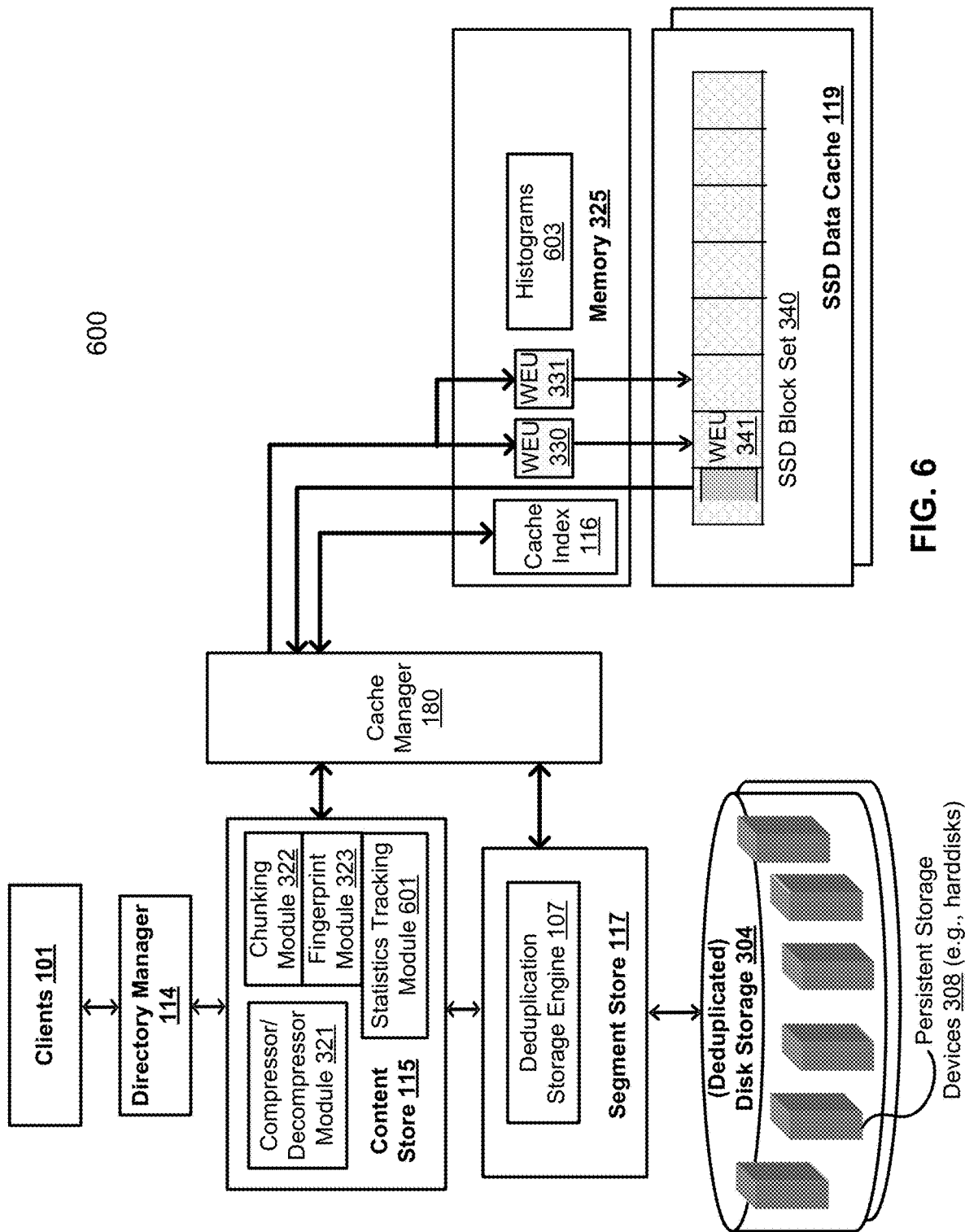
FIG. 6 is a block diagram illustrating example architecture of a storage system according to another embodiment of the invention.

FIG. 6 is a block diagram illustrating example architecture of a storage system that detects frequently used regions of SSD data cache according to another embodiment of the invention. Referring to FIG. 6, storage system 600 may be implemented as part of storage system 104 of FIG. 1. Content store 115 includes a statistics tracking module 601. Memory 325 includes histograms 603 generated by statistics tracking module 601. For each file stored in the storage system, one or more histogram buckets corresponding to one or more regions of each file is created and updated over the life of the file. Statistics tracking module 601 and histograms 603 may keep track of frequency of access (read/write) over a period of time for the one or more regions of each file. For example, disk storage 304 may contain terabytes of data files. Data files may be divided into 100 GB files, each 100 GB file having 100 1 GB regions such that each 1 GB region may be associated with a histogram bucket. Histogram buckets may contain a timestamp and types of access, i.e., read or write access, for each file region. Histogram buckets may be updated each time a corresponding file region is accessed from disk storage 304, such that histograms 603 may plot a hierarchy of "hot" regions (frequency and recency of read/write access) of each file stored in disk storage 304. Histogram 603 may maintain records of file object for a predetermined time period in the past. Periodically, the top 10-20% of hot file regions may be cached in SSD data cache 119 via cache manager 180. In another embodiment, segments that are read/write from "cold" file regions or not associated with frequently accessed file regions are dropped such that they are not written to cache 119. Note that file regions of 1 GB is illustrated in the above example for purposes of demonstration, however, each file regions may be of any size.

In one embodiment, when the miss rate of the SSD data cache or cache 119 is high for client requests, storage system may populate the cache aggressively, i.e., any segment read/write from storage system are populated to cache 119 if they are not previously stored in cache 119. Hit (or miss) rate refers to a probability that a requested data segment is previously stored in (or absent from) a respective device. However, when a SSD churn is high or a hit rate of cache 119 is above 50% then a write strategy may be employed to reduce write-erase cycles. SSD churn refers to the number of unnecessary writes or write-erases of a SSD device over a specified time period, such that the data is almost never used. A write strategy may be employed when certain conditions are met, for example, when data are read from disk storage, such as disk storage 304, and the data is stored in a region of a top 10% of "hot" file regions, then the retrieved data segments may be written to SSD data cache 119. In another embodiment, the percentage of "hot" file regions may be automatically adjusted to correspond to some statistics such as a hit rate or SSD churn rate of cache 119. A write strategy limiting write-erase cycles ensures SSD devices of SSD data cache 119 do not fail prior to its intended life since frequent write-erase will reduce SSD devices' lifetime. The "hotness" or frequency of access of a file or regions of a file and/or a miss rate of cache 119 determines whether segments of the files should be populated to SSD data cache 119. A miss rate of cache 119 may be a global cache miss rate, i.e., of the entire cache, or window based, i.e., limited to a certain region of the SSD data cache.

In one embodiment, segments are written to SSD data cache 119 for segments previously stored in disk storage 304 of FIG. 6. For example, when client 101 requests data from the storage system 600, content store 115 looks up cache index 116 and determines whether data segments are previously stored in SSD data cache 119. If it is not, content store 115 retrieves the compressed segments from disk storage 304 via segment store 117. Upon retrieval, the compressed segments may or may not be the same compression size or compression type of the SSD data cache. Content store 115 decompresses the retrieved segments, divides the segments into segments compatible with SSD data cache 119, compresses the segments, and stores them in SSD data cache 119. One or more entries are added to cache index 116 to reflect the new segments stored in SSD cache 119 to map a fingerprint of the data segments to a storage location of the WEU in an SSD device of cache 119.

In one embodiment, storage system may examine a data stream associated with the data segment to determine an access pattern of the data stream. For example, storage system 600 of FIG. 6 when randomly accessed will have a different access pattern than when storage system 600 is accessed to restore a snapshot of a client 101. When storage system determines a access pattern is a recovery then the segments read from storage disk 304 are not stored in cache 199. When the access pattern is determined to be random, then it may be stored in cache 119 for subsequent access when a write strategy condition is met. For example, a write strategy condition may be that the segment to be stored resides on a top 10-20% of "hot" file regions. In another embodiment, in response to a second request to read a second segment, storage system determines whether cache 119 stores the second segment. Content store 115 retrieves the second data segment from disk storage 304 if cache 119 does not contain the second data segment and caches the second data segment in cache 119 if the second data segment is associated with a second file region that is frequently accessed or "hot" file region.

In another embodiment, segments are written to SSD data cache 119 in a backup operation. For example, when client 114 backs up data, data segments may be an incremental backup representing a difference between a first snapshot and a second snapshot of backups taken at different points in time. Snapshot is an image of an instance in time of a backup system. In this scenario, chunking module 322 of content store 115 divides the difference or delta segments into segments compatible with SSD data cache 119. Compression/decompression module 321 compresses the segments and the segments are written to SSD data cache 119. Cache index 116 is updated to reflect the new segments stored in SSD data cache 119. In another embodiment, the incremental backup data is not stored in SSD data cache 119 when certain conditions are met, for example, when SSD data cache 119 hit rate reaches a predefined threshold.

Figure 7A:
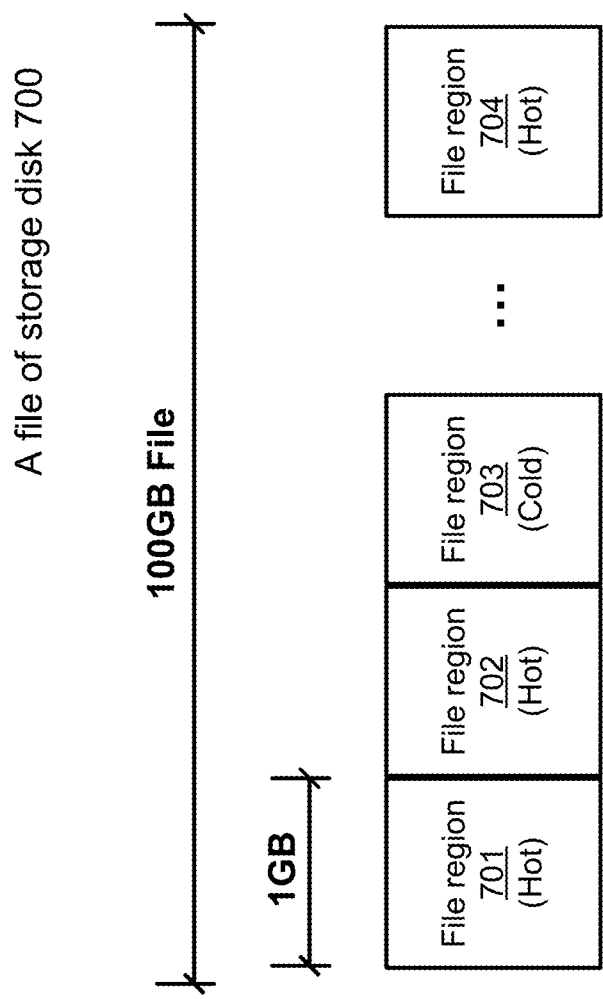
FIG. 7A is a block diagram illustrating an example file from storage disk according to one embodiment of the invention.

FIG. 7A is a block diagram illustrating an example file from storage disk according to one embodiment of the invention. In this scenario, storage system predetermines when to write to SSD data cache to limit the number of write-erase cycles to SSD data cache. File 700 may be a logical grouping of deduplicated compressed segments stored in storage disk 304 of FIG. 6, for example, with a file size of 100 GB having file regions of size 1 GB. Each of the file regions' access patterns may be recorded in a corresponding histogram, such as histograms 603 of FIG. 6. For example, statistics tracking module 601 of FIG. 6 may record access statistics of each of the file regions stored on storage disk 304, or a combination of the file regions. The statistics are stored in histograms 603. Access statistics may include a frequency of write/read, a number of IOs of the file regions. The file region size of 1 GB and file size of 100 GB should not be construed as limiting, e.g., the file and data cache sizes may be any suitable sizes.

Referring to FIG. 7A, histograms may record access statistics showing that file regions 701, 702, and 704 are hot regions, and file region 703 is a cold region. In this scenario, when read request is made to the storage disk 304 and the segments requested reside in file regions 701, 702, and 704, then retrieved segments are recorded on SSD data cache 119 for subsequent access. In another embodiment, when read request is made to the storage disk 304 and the segments requested reside in file regions 701, 702, and 704, and file regions 701, 702, and 704 are top 10% of hot regions of file 700, only then will the segments be recorded on cache 119 for subsequent access.

Figure 7B:
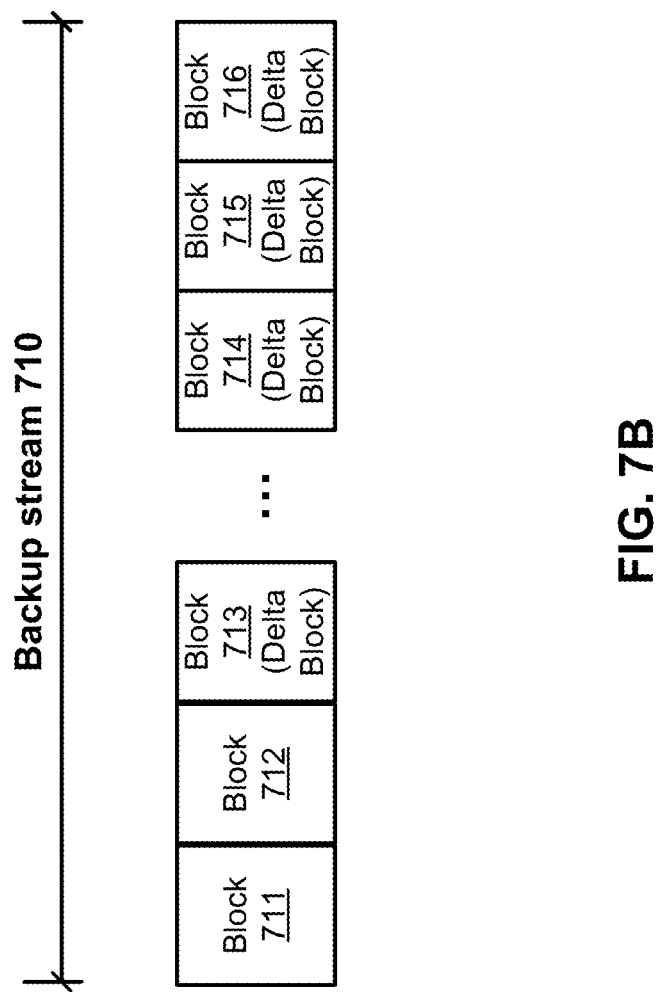
FIG. 7B is a block diagram illustrating an example data stream to be backed up according to one embodiment of the invention.

FIG. 7B is a block diagram illustrating an example data stream to be backed up according to one embodiment of the invention. In this embodiment, the data stream may be a replication or backup stream sent by client 101 to storage system 600 of FIG. 6. Storage system 600 predetermines the delta blocks of the data stream, i.e., difference of segments between a first snapshot and a second snapshot, and writes the delta blocks to SSD data cache 119. Referring to FIG. 7B, block 711-716 are data blocks of backup stream 710. In this scenario, content store 115 of FIG. 6 looks up cache index 116 and/or index 204 of FIG. 2 to determine if blocks 711-712 are previously stored on storage system 600. If blocks 713-716 are determined to be delta blocks, then blocks 713-716 are written to SSD data cache 119.

In another embodiment, when client 101 writes files to storage system 600, a fraction of the file segments, but not all, may be stored in SSD data cache 119 to limit the write-erase cycles of SSD data cache 119. For example, 50 percent of all writes may be stored in SSD data cache 119, i.e., content store writes every other segment that is written to the persistent hard disks of storage system to SSD data cache 119. In another embodiment, the percentage writes may be randomized. In another embodiment, the percentage writes may be inversely proportional to a SSD cache hit rate. In another embodiment, the percentage writes may depend on a churn rate to be controlled of SSD data cache 119. The storage system may consider global churn, a churn for a region of SD devices of SSD data cache 119, or a bursty (short-term) churn. A very high churn rate reduces the useful life of a SSD device.

Figure 8:
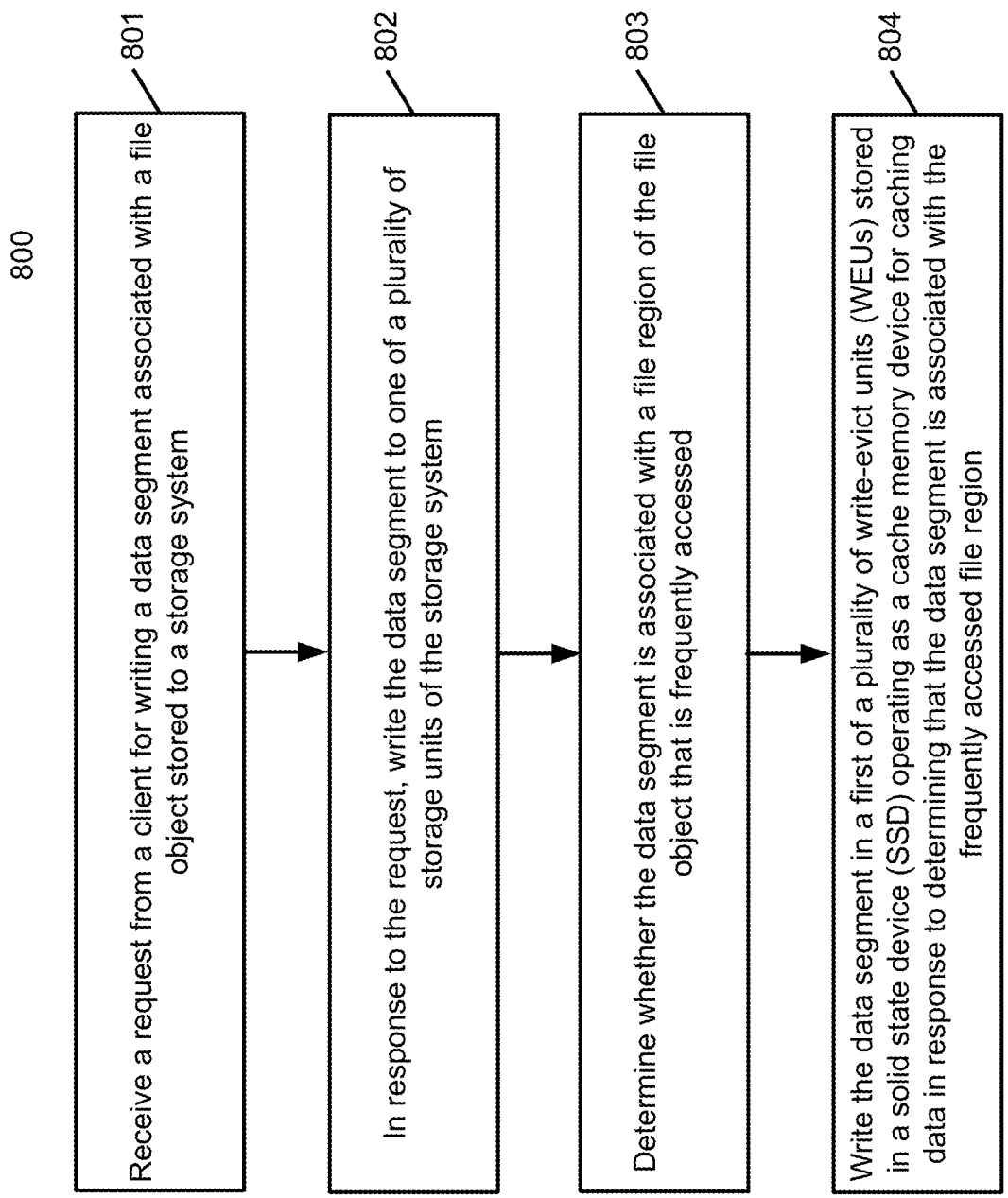
FIG. 8 is a flow diagram illustrating an overview of a method to write data segments effectively to a SSD data cache of a storage system according to one embodiment of the invention.

FIG. 8 is a flow diagram illustrating a process of 800 according to one embodiment of the invention. Process 800 may be performed by processing logic that includes hardware (e.g. circuitry, dedicated logic, etc.), software (e.g., embodied on a non-transitory computer readable medium), or a combination thereof. For example, process 800 may be performed by content store 114 of FIG. 3. Referring to FIG. 8, at block 801, processing logic receives a request from a client for writing a data segment associated with a file object stored to a storage system. At block 802, in response to the request, processing logic writes the data segment to one of a plurality of storage units of the storage system. At block 803, processing logic determines whether the data segment is associated with a file region of the file object that is frequently accessed. At block 804, processing logic writes the data segment in a first of a plurality of write-evict units (WEUs) stored in a solid state device (SSD) operating as a cache memory device for caching data in response to determining that the data segment is associated with the frequently accessed file region.

In one embodiment, processing logic drops the data segment without writing to the SSD device (e.g., cache 119 of FIG. 6) in response to determining that the data segment is not associated with the frequently accessed file region (e.g., file region 703 of FIG. 7A). In one embodiment, processing logic adds an index entry, such as a 14-byte index entry of FIG. 4, into cache index 116 to map a fingerprint of the data segment to a storage location of the first WEU (e.g., WEU 341 of FIG. 6) in the SSD device (e.g., cache 119 of FIG. 6). In one embodiment, processing logic maintains a histogram (e.g., histograms 603 of FIG. 6) for the file object recording access statistics of the file object in a predetermined time period in the past, wherein whether the data segment is frequently accessed is determined based on the histogram (e.g., histograms 603 of FIG. 6) of the file object.

In one embodiment, processing logic examines a data stream associated with the data segment to determine an access pattern of the data stream. For example, a data stream may be a data stream written to storage system 600 by a client for backup purposes. Alternatively, a data stream written to storage system 600 by a client for random access purposes. Processing logic determines whether the data segment is randomly accessed based on the accessed pattern of the data stream, such that the data segment is cached in the SSD device (e.g., cache 119 of FIG. 6) only if the data segment is randomly accessed. One mechanism may be a tag sent by the client to signal an access request is a backup request such that data received by the storage system associated with the access request will not be stored in cache 119. In one embodiment, in response to a second request to read a second segment, processing logic determines whether the SSD device (e.g., cache 119) stores the second segment. Processing logic retrieves the second data segment from a second of the storage units if the SSD device (e.g., cache 119) does not contain the second data segment and caches the second data segment in the SSD device (e.g., cache 119) if the second data segment is associated with a second file region that is frequently accessed (e.g., file region 701 of FIG. 7A). In one embodiment, the data segment is a part of incremental backup representing a difference between a first snapshot and a second snapshot (e.g., Delta blocks 713-716 of FIG. 7B). Snapshot is an image of an instance in time of a backup of a client system.

Figure 9:
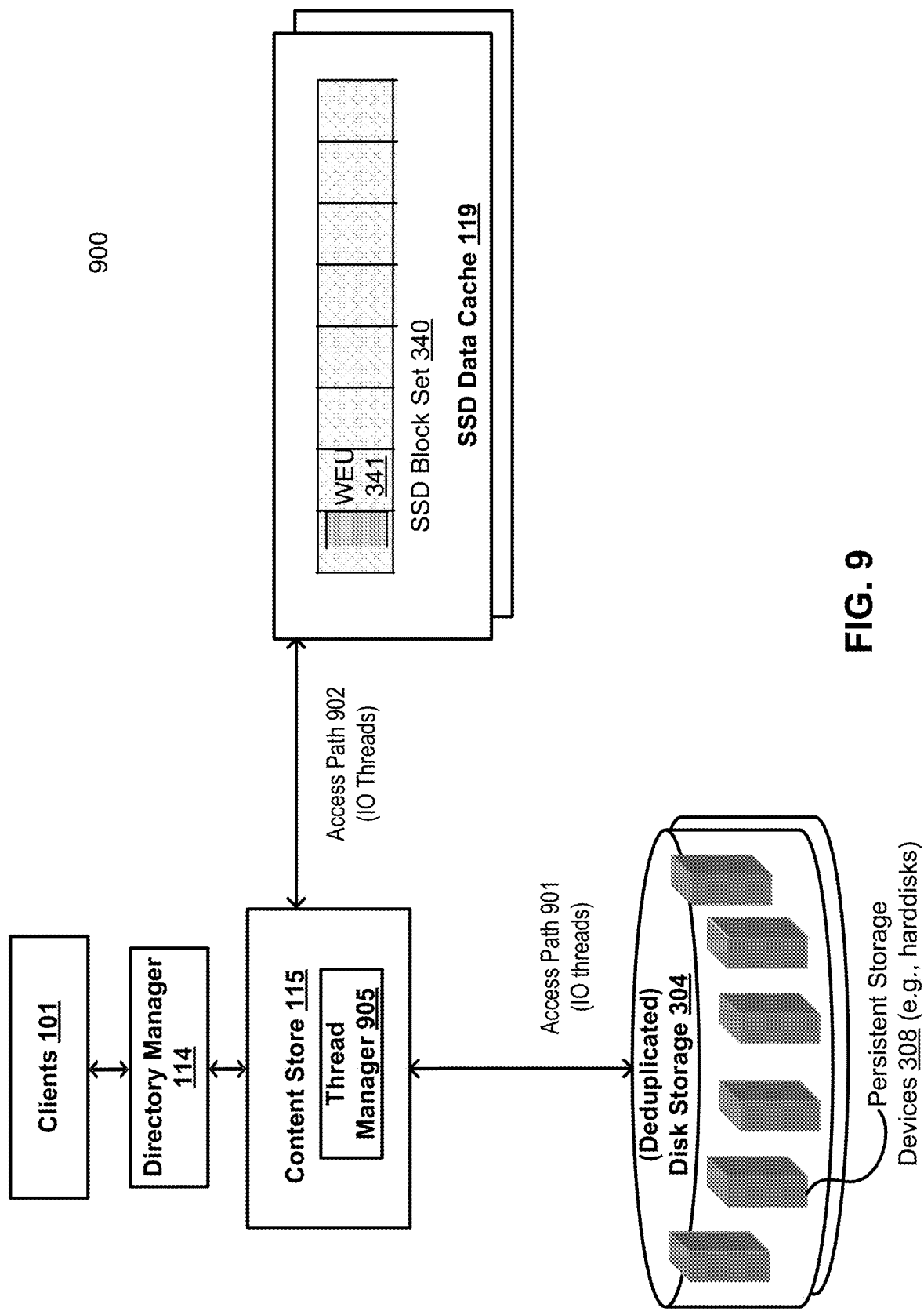
FIG. 9 is a block diagram illustrating input/output threads between a data cache and a content store, and input/output threads between a persistent storage units and a content store according to one embodiment of the invention.

FIG. 9 is a block diagram illustrating input/output threads between a data cache and a content store, and input/output threads between persistent storage units and a content store according to one embodiment of the invention. Storage system 900 may be implemented as part of storage system 104 of FIG. 1. Referring to FIG. 9, input/output access paths from client 101 to disk storage 304 and from client 101 to SSD data cache 119 are independent access paths. For example, a batch request for consecutive segments to disk storage 304 is through access path 901 and typically consumes 10 milliseconds, while a batch request to SSD data cache 119 is through access path 902 and typically consumes one millisecond. A batch request to retrieve data from disk storage 304 is independent of a batch request to retrieve data from SSD data cache 119. Each batch request consumes one IO thread such that a storage system with 100 CPU cores may fulfill 100 batch requests simultaneously, i.e., storage system has capacity for 100 concurrent IO threads.

Figure 10A:
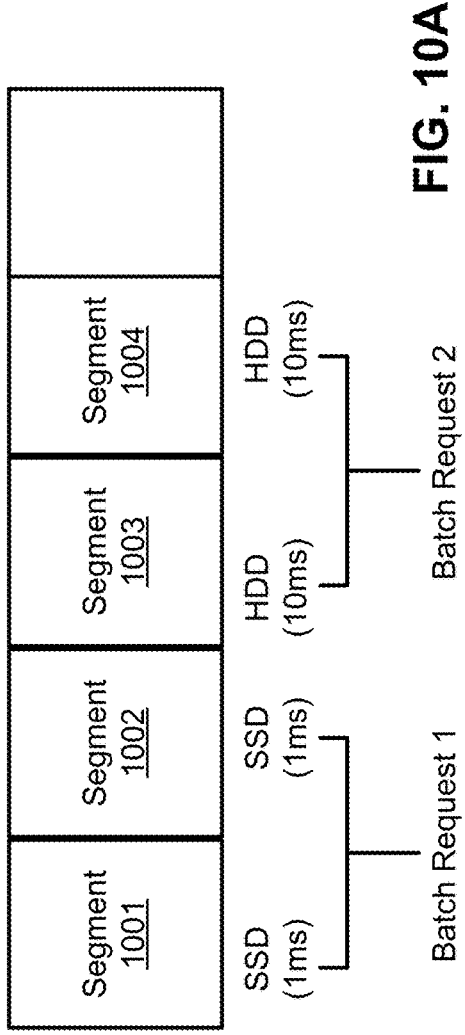
FIG. 10A is a block diagram illustrating an example request of four data segments from a storage system according to one embodiment of the invention.

FIG. 10A is a block diagram illustrating an example request of four data segments from a storage system according to one embodiment of the invention. Segments 1001-1004 may be L0 or LP segments. When storage system receives segments request from client (via a file request), content store, such as content store 115 of FIG. 9, looks up a cache index in memory for a fingerprint of the segments to determine if a copy of the segments are stored in SSD data cache. Referring to FIG. 10A, in this scenario, segments 1001-1002 reside in SSD data cache, while segments 1003-1004 reside in hard disks. Storage system groups segments 1001-1002 into a first group of data segments, batch request 1. Storage system groups segments 1003-1004 into a second group of data segments, batch request 2. Storage system submits batch requests 1 and 2 simultaneously with two IO threads, such that the requests will be fulfilled in 10 milliseconds (a read of multiple consecutive segments has the same latency cost), or a time required to fulfill one request having the largest latency. In this case, batch requests on two IO threads have a saving of 12 milliseconds. In this example, content store 115 would receive the data from SSD device prior to receiving data retrieved from the HDDs. In one embodiment, content store 115 waits for the data returned from the HDDs without first returning the data obtained from the SSD. When all data have been received from the HDDs and the SSD, the data are then returned to the client altogether.

Figure 10B:
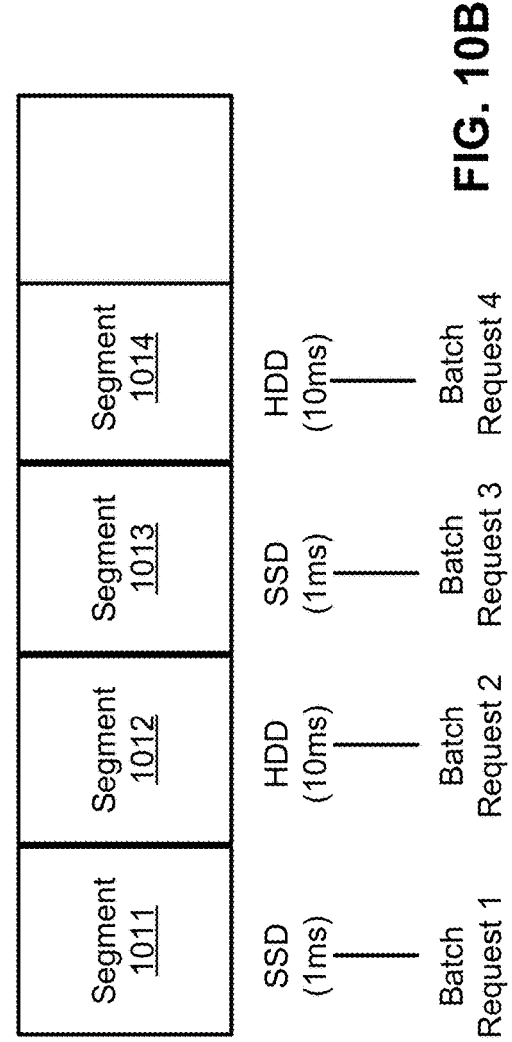
FIG. 10B is a block diagram illustrating a second example request of four data segments from a storage system according to one embodiment of the invention.

FIG. 10B is a block diagram illustrating a second example request of four data segments from a storage system according to one embodiment of the invention. Segments 1011-1014 may be L0 or LP segments. When storage system receives segments request from client (via a file request), content store, such as content store 115 of FIG. 9, looks up a cache index in memory for a fingerprint of the segments to determine if a copy of the segments are stored in SSD data cache. Referring to FIG. 10B, in this scenario, segments 1011, 1013 reside in SSD data cache, while segments 1002, 1004 reside in hard disks. Storage system groups segment 1011 into a first group of data segment for batch request 1. Storage system groups segment 1012 into a second group of data segment for batch request 2. Storage system groups segment 1013 into a third group of data segment for batch request 3. Storage system groups segment 1014 into a fourth group of data segment for batch request 4. Because segments 1011 and 1013 are not consecutive segments, they are not grouped together. Similarly, because segments 1012 and 1014 are not consecutive segments, they are not grouped together. Storage system submits batch requests 1-4 simultaneous using four IO threads such that the requests will be fulfilled in 10 milliseconds, or a time required to fulfill a request having the largest latency. In this case, batch requests on four IO threads have a saving of 12 milliseconds.

FIG. 11 is a flow diagram illustrating a process of 1100 according to one embodiment of the invention. Process 1100 may be performed by processing logic that includes hardware (e.g. circuitry, dedicated logic, etc.), software (e.g., embodied on a non-transitory computer readable medium), or a combination thereof. For example, process 1100 may be performed by content store 115 of FIG. 3. Referring to FIG. 11, at block 1101, processing logic receives a request from a client at a storage system for accessing a plurality of data segments associated with a file object. At block 1102, for each of a first groups of the data segments requested that are stored in a solid state device (SSD) operating as a cache memory device, processing logic requests a first batch job for each of the first groups to retrieve the first groups of the data segments from the SSD device via a first set of one or more input/output (IO) threads. At block 1103, for each of a second groups of the data segments requested that are not stored in the SSD device, processing logic requests a second batch job for each of the second groups to retrieve the second groups of the data segments from one or more storage units of the storage system. At block 1104, processing logic assembles each group of the first and second groups into the requested sequential data segments received via the first set and the second set of IO threads. At block 1105, processing logic returns the requested data segments to the client altogether.

In one embodiment, the batch jobs of each group of the first groups are requested concurrently. In another embodiment, the batch jobs of each of the second groups are requested concurrently with the batch jobs of each of the first groups.

In one embodiment, processing logic calculates a fingerprint based on a file data segment of the requested file object, and looks up an in-memory index based on the fingerprint to determine if the file data segment is stored in the cache memory device. In one embodiment, for each of the second groups of one or more sequential data segments requested that are not stored in the cache memory device, processing logic populates each of the data segments of each of the second groups to the cache memory device such that subsequent requests for the data segment are retrieved from the cache memory device. In one embodiment, the data segments of the cache memory device are encrypted and compressed segments.

Figure 12:
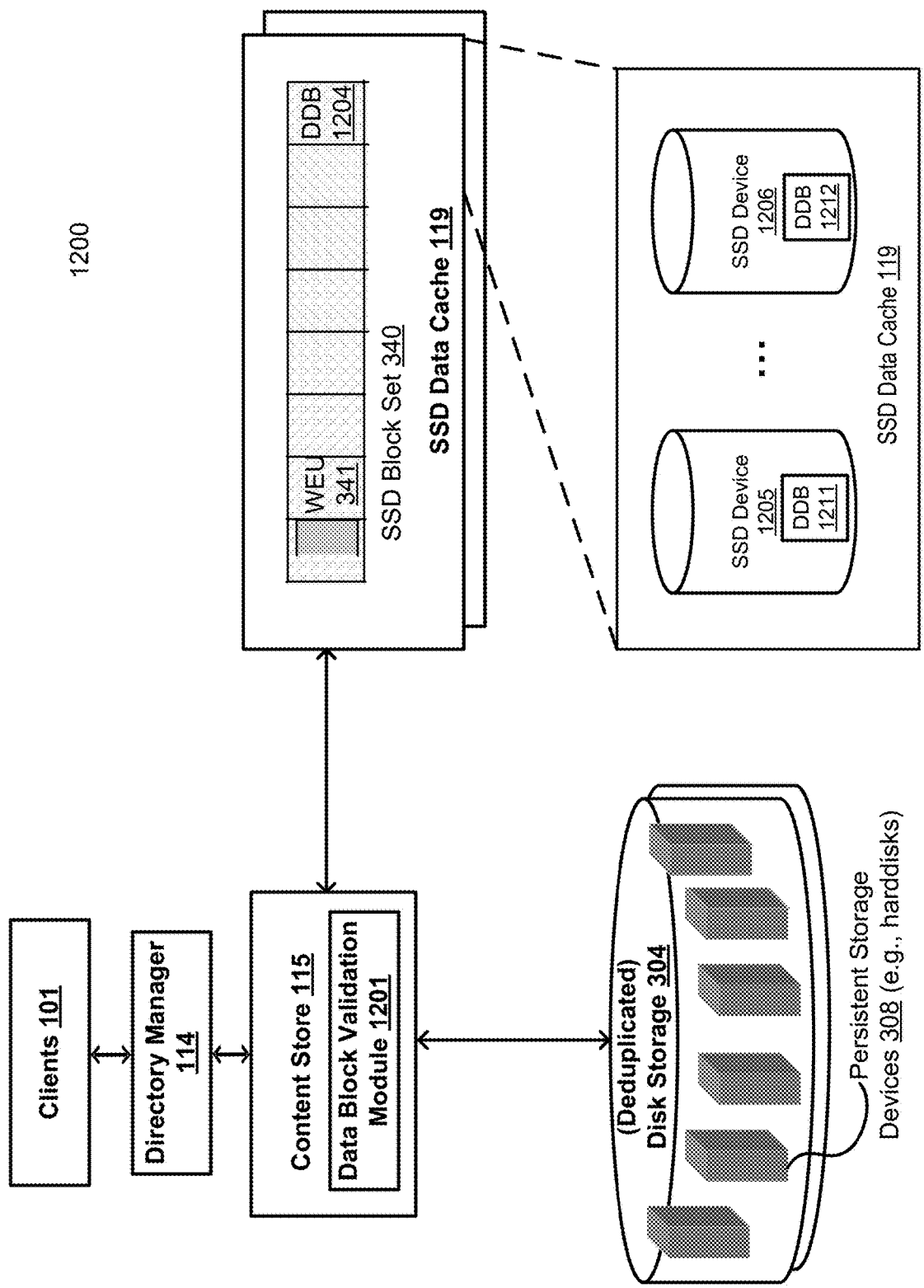
FIG. 12 is a block diagram illustrating a storage system according to another embodiment of the invention.

FIG. 12 is a block diagram illustrating a storage system according to another embodiment of the invention. Storage system 1200 may be implemented as part of storage system 104 of FIG. 1. SSD data cache 119 reserves a block for a descriptive data block (DDB) 1204 to keep track of invalid blocks of WEUs or of entire WEUs of SSD data cache 119. A block of WEU may be invalid for any number of reasons, such as checksum failure, corruption, or disk failure. For example, an operating system event may trigger a disk failure event when a SSD device of SSD data cache 119 fails. A system event such as a disk failure triggers a subroutine to invalidate the affected SSD data blocks. The invalidation is recorded by validation module 1210 in DDB 1204 such that subsequent access to the invalid blocks of SSD data cache 119 will return a read failure. SSD data cache may include a number of devices such as SSD devices 1205-1206. Each of the SSD devices 1205-1206 reserves a descriptive data block such that DDB 1211-1212 is a mirror image of DDB 1204. In other words, DDB 1204 is an abstraction of DDB 1211-1212. Upon a disk failure, DDB 1204 may be recovered from any of DDB 1211-1212. In one embodiment, a copy of DDB 1204 resides on memory (not shown) such that content store 115 can determine invalid blocks in-memory without having to access SSD data cache 119.

Figure 13A:
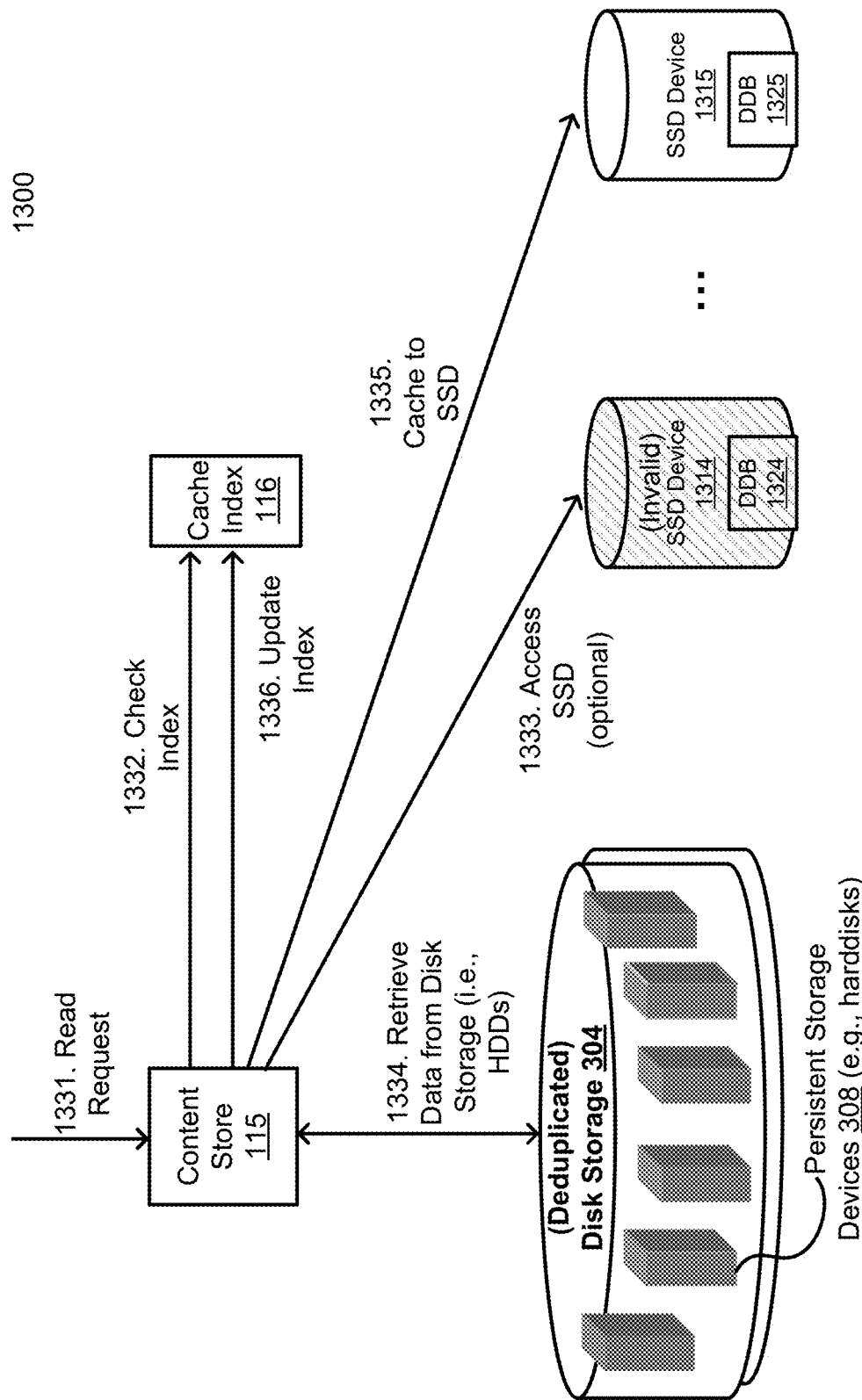
FIG. 13A is a block diagram illustrating a read operation from an SSD data cache with an invalid SSD device according to one embodiment of the invention.

FIG. 13A is a block diagram illustrating a read operation from an SSD data cache with an invalid SSD device according to one embodiment of the invention. In one embodiment, at stage 1331, content store 115 receives a segment read request from a client (not shown). At stage 1332, content store 115 checks in memory cache index 116 to determine if the requested segment resides in SSD data cache 119. For example, cache index 116 indicates segment resides in SSD device 1314, at stage 1333, content store 115 accessed SSD device 1314 and finds out that it is invalid via a read failure. Alternatively, content store 115 looks up a DDB in memory and predetermines SSD device 1314 is invalid and skips stage 1333. At stage 1334, content store 115 retrieves data segments from disk storage (i.e., HDDs), such as disk storage 304. At stage 1335, content store caches the retrieved data segments to the next available, or valid, SSD device such as SSD device 1315. At stage 1336, content store 115 updates cache index 116 to reflect that the retrieved segment resides in a particular WEU of SSD device 1315 such that subsequent accesses to the segment is via cache 119.

Figure 13B:
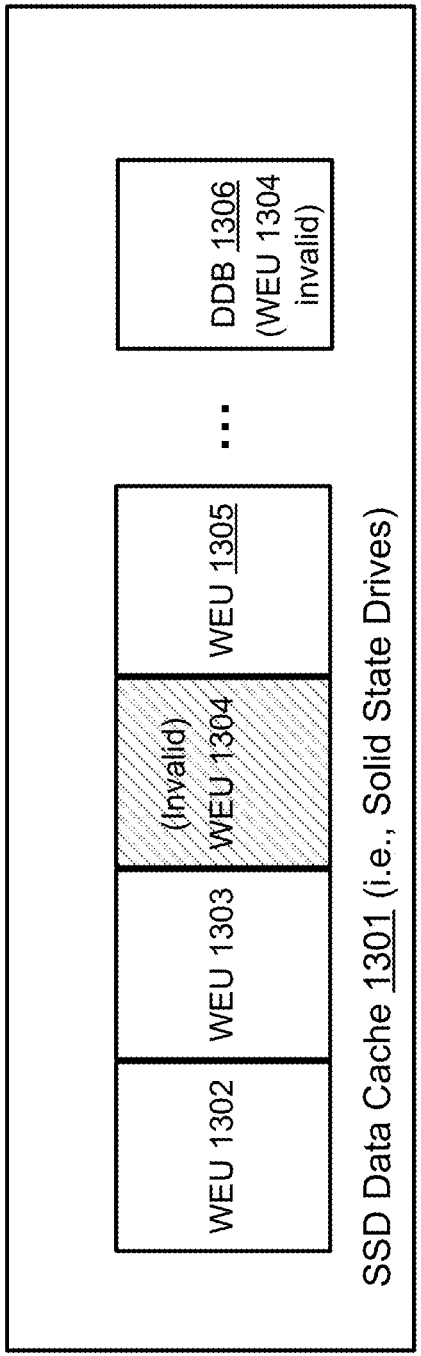
FIG. 13B is a block diagram illustrating a SSD data cache with an invalid WEU according to one embodiment of the invention.

FIG. 13B is a block diagram illustrating a SSD data cache with an invalid WEU according to one embodiment of the invention. SSD data cache 1301 may be SSD data cache 119 of FIG. 12. Referring to FIG. 13B, SSD block set includes WEU 1302-1305. Block 1306 is reserved for descriptive data block. DDB 1306 may simply be a list or a table of entries recording a SSD device ID, WEU ID, and a block range or block size that corresponds to invalid blocks of cache 119. In another embodiment, DDB 1306 may store an entry of address location and range. Referring to FIG. 13B, in this scenario, WEU 1304 is invalidated and DDB 1306 may contain an entry with address information and a range corresponding to WEU 1304. DDB 1306 additionally may contain a SSD device ID, WEU ID (i.e., 1304), and block range (entire range of 1 MB) of the corresponding to invalid blocks of cache 119.

Figure 13C:
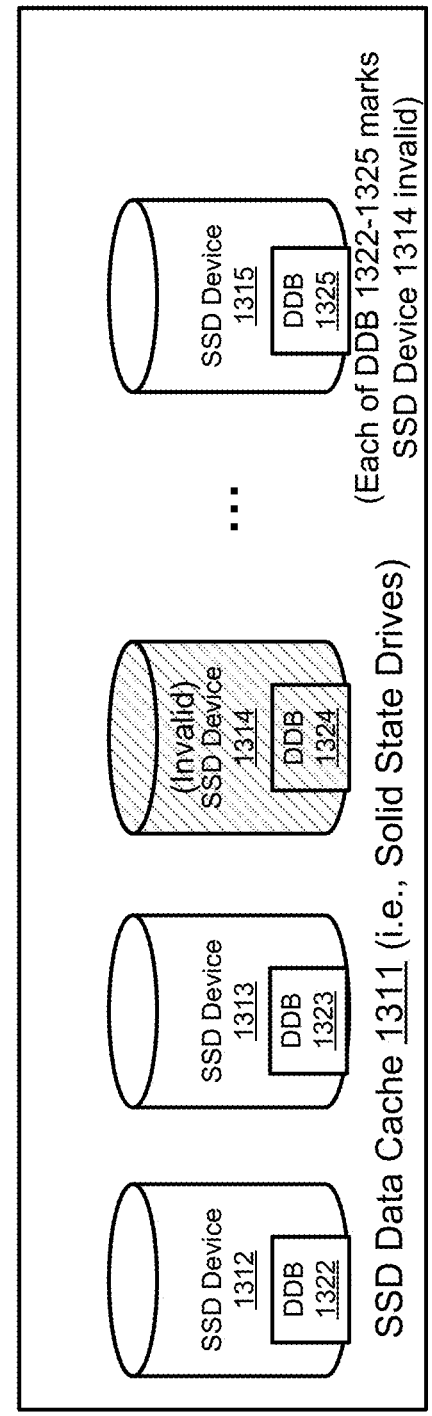
FIG. 13C is a block diagram illustrating a SSD data cache with an invalid SSD device according to one embodiment of the invention.

FIG. 13C is a block diagram illustrating a SSD data cache with an invalid SSD drive according to one embodiment of the invention. SSD data cache 1311 may be SSD data cache 119 of FIG. 12. Referring to FIG. 13C, SSD data cache 1311 includes SSD devices 1312-1315. Each of the SSD devices 1312-1315 includes an address range reserved for DDB, such as DDB 1322-1325. DDB 1322-1325 are mirror images of each other. An entry in DDB 1322-1325 describes an address range of SSD data cache that is invalid and not accessible. The entry may include a SSD device ID, WEU ID (in this case, all WEUs) and an address range. In one embodiment, a copy of DDB 1322 resides in storage system memory. Referring to FIG. 13C, in this scenario, SSD device 1314 is invalid and DDB 1322-1325 each contains an entry with information describing the invalid SSD device 1314, includes all WEUs and all address range of SSD device 1314.

Figure 14:
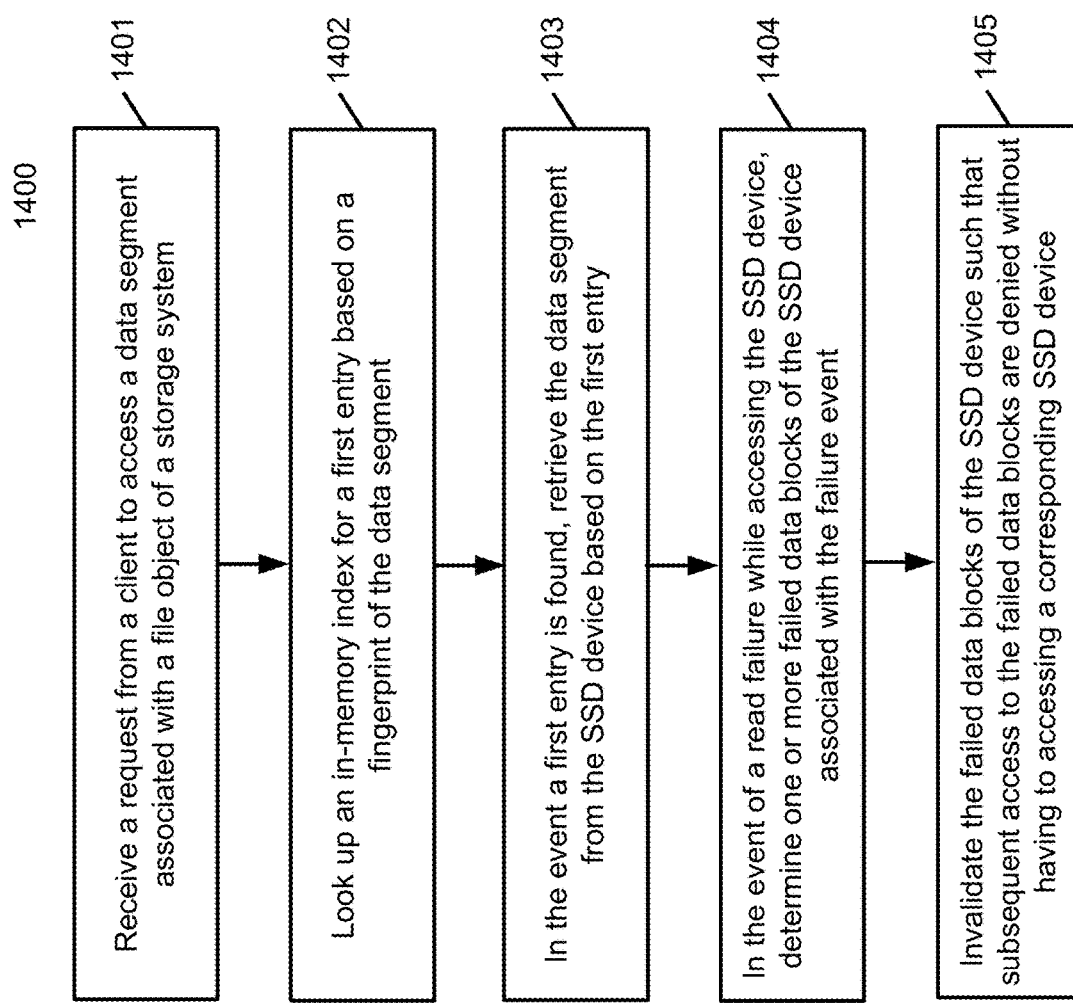
FIG. 14 is a flow diagram illustrating a method to invalidate failed data blocks of a SSD data cache according to one embodiment of the invention.

FIG. 14 is a flow diagram illustrating a process of 1400 according to one embodiment of the invention. Process 1400 may be performed by processing logic that includes hardware (e.g. circuitry, dedicated logic, etc.), software (e.g., embodied on a non-transitory computer readable medium), or a combination thereof. For example, process 1400 may be performed by content store 115 of FIG. 12. Referring to FIG. 14, at block 1401, processing logic receives a request from a client to access a data segment associated with a file object of a storage system. At block 1402, processing logic looks up an in-memory index for a first entry based on a fingerprint of the data segment. At block 1403, in the event a first entry is found, processing logic retrieves the data segment from the SSD device based on the first entry. At block 1403, in the event of a read failure while accessing the SSD device, processing logic determines one or more failed data blocks of the SSD device associated with the failure event, and invalidates the failed data blocks of the SSD device such that subsequent access to the failed data blocks are denied without having to accessing a corresponding SSD device.

In one embodiment, invalidating the failed data blocks includes recording on a descriptive data block of the SSD device, information of the failed data blocks of the SSD device, such that subsequent read requests will check the descriptive data block for validity of requested data blocks, and propagating the descriptive data block associated with the SSD device to each disk volume of a plurality of disk volumes of the SSD device. For example, storage system invalidates a WEU, such as WEU 1304 of FIG. 13A, by recording an entry of WEU 1304's invalidity in DDB 1306 of SSD data cache 1301. DDB 1306 is mirrored onto each DDBs of SSD devices for improved fault tolerance. For example, SSD data cache 1301 may be made up of multiple SSD devices such as SSD devices 1312-1315 of SSD data cache 1311 of FIG. 13C. An entry in DDB 1306 would be mirrored to DDBs 1322-1325 of FIG. 13C.

Subsequent requests for segments will check if the segments reside in an invalid WEU of SSD data cache 1301 by looking up an address range from any one of DDBs 1322-1325. In one embodiment, processing logic propagates a copy of the descriptive data block in-memory such that validity of requested data blocks can be determined in-memory without accessing the SSD device. For example, a copy of DDB 1322 may be stored in memory so that a look up may be performed without accessing cache 119.

In one embodiment, in the event of a read failure from cache 119, such as, in stage 1333 of FIG. 13A, processing logic retrieves the requested data segment from a storage unit of the storage system, e.g., disk storage 304 of FIG. 12. Upon receiving the requested data segment form disk storage 304, processing logic populates cache 119 with the requested data segment. In another embodiment, processing logic detects a failure event while writing a new data segment to the SSD device, e.g., SSD device 1314 of FIG. 13B, and in the event of a write failure, processing logic invalidates the data blocks of the SSD device 1314 associated with the write request such that subsequent access to the failed data blocks are unavailable. For example, processing logic adds an entry to a DDB stored in memory to reflect that the accessed data blocks of SSD device 1314 of cache 119 is invalid such that subsequent access to the failed data blocks are unavailable. In another embodiment, processing logic writes the new data segment to a second SSD device, e.g., SSD device 1315, and updates the in-memory cache index 116 to map a fingerprint of the new data segment to the second SSD device, e.g., SSD device 1315.

In one embodiment, failure of the cache memory device includes a checksum failure, a volume failure, a corruption, and a disk failure. In one embodiment, upon detection of an event associated with a hot-plug of one of a plurality of individual SSD devices, processing logic updates the descriptive data block of the SSD device to remove information of failed data blocks associated with one or more disk volumes of the hot-plugged individual SSD device.

Note that some or all of the components as shown and described above (e.g., content store 115 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 15:
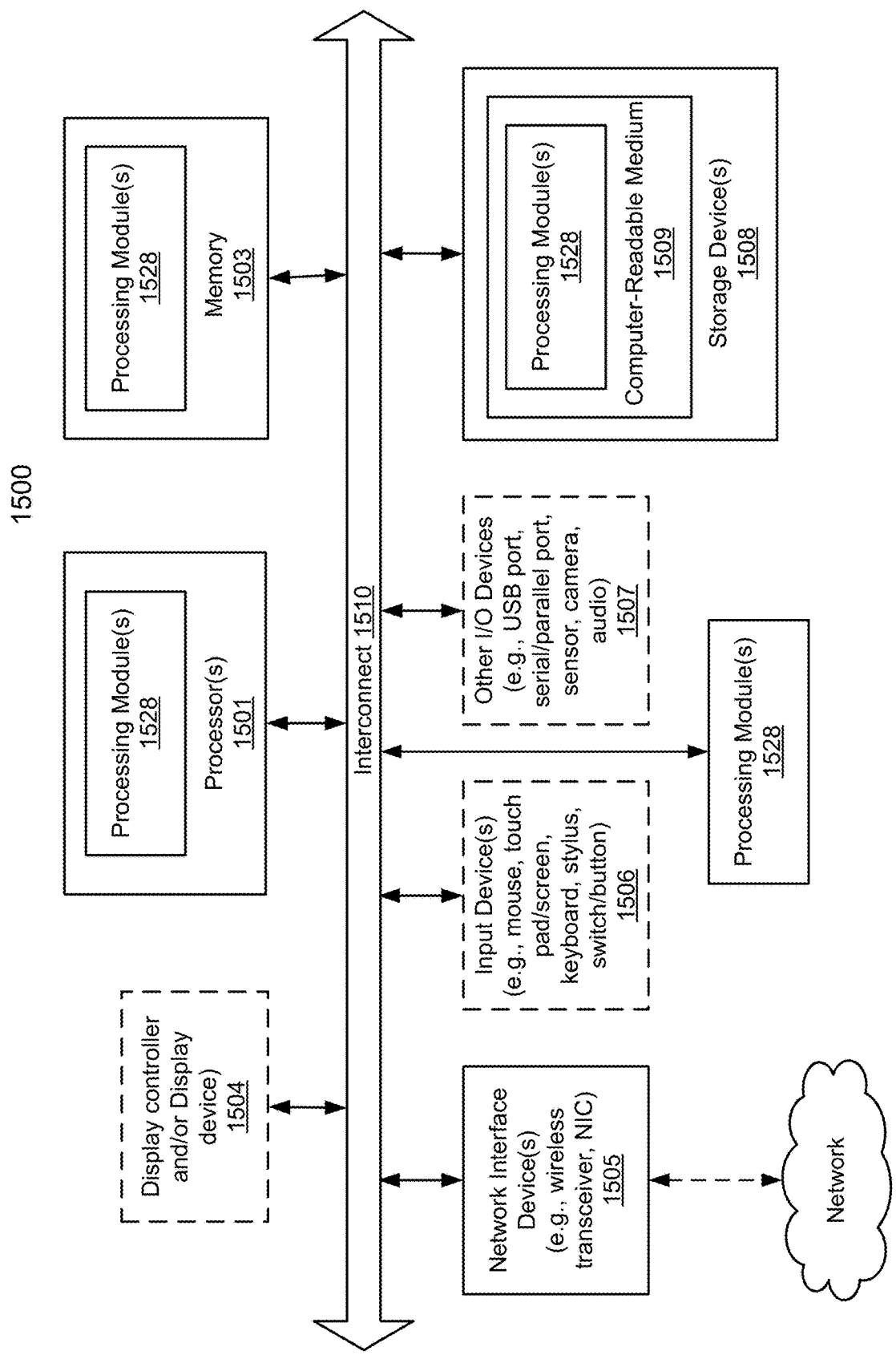
FIG. 15 is a block diagram illustrating a data processing system according to one embodiment.

FIG. 15 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, the method comprising:

receiving a request from a client to access a data segment associated with a file object of a storage system;

looking up an in-memory index for a first entry based on a fingerprint of the data segment, wherein the in-memory index includes a plurality of entries, each entry mapping the fingerprint of the data segment being contained in a log-structured container to a storage location of a solid state device (SSD) storing a corresponding data segment;

in the event a first entry is found, retrieving the data segment from the SSD based on the first entry;

in the event of a read failure while accessing the SSD, determining one or more failed data blocks of the SSD associated with the failure event; and invalidating the failed data blocks of the SSD in response to determining the one or more failed data blocks, the invalidating of the failed data blocks of the SSD being recorded such that subsequent access to the failed data blocks are denied without having to accessing a corresponding SSD, wherein invalidating the failed data blocks comprises:

recording on a descriptive data block of the SSD, information of the failed data blocks of the SSD, such that subsequent read requests will check the descriptive data block for validity of requested data blocks, wherein the information of the failed data blocks include a table of entries recording a SSD device identifier (ID), a write-evict unit (WEU) ID identifying a WEU storing the requested data segment, and a block range or block size that corresponds to invalid blocks; and propagating the recorded descriptive data block associated with the SSD to each disk volume of a plurality of disk volumes of the SSD, wherein each disk volume of the plurality of disk volumes of the SSD reserves the descriptive data block, such that each of the reserved descriptive data block includes a mirror image of the recorded descriptive data block having information of the failed data blocks of the SSD, each of the reserved descriptive data block marking an invalid disk volume of the plurality of disk volumes of the SSD.

2. The computer-implemented method of claim 1, further comprising: propagating a copy of the descriptive data block in-memory such that validity of requested data blocks can be determined in-memory without accessing the SSD.

3. The computer-implemented method of claim 1, further comprising:
in the event of a read failure, retrieving the requested data segment from a storage unit of the storage system; and
upon receiving the requested data segment form the storage unit, populating the SSD with the requested data segment.

4. The computer-implemented method of claim 3, further comprising:
detecting a failure event while writing a new data segment to the SSD; and
in the event of a write failure, invalidating the data blocks of the SSD associated with the write request such that subsequent access to the failed data blocks are unavailable.

5. The computer-implemented method of claim 4, further comprising:
writing the new data segment to a second SSD; and
updating the in-memory index to map the fingerprint of the new data segment to the second SSD, the fingerprint of the new data segment being contained in a log-structured container, the log-structured container being structured into a metadata section and a compression region section.

6. The computer-implemented method of claim 1, wherein a failure of the cache memory device comprises: a checksum failure, a volume failure, a corruption, and a disk failure.

7. The computer-implemented method of claim 1, further comprising:
upon detection of an event associated with a hot-plug of one of a plurality of individual SSDs, updating the descriptive data block of the SSD to remove information of failed data blocks associated with one or more disk volumes of the hot-plugged individual SSD.

8. A non-transitory machine-readable medium having instructions stored therein, which when executed by a processor, cause the processor to perform operations to sort data elements in a data array, the operations comprising:
receiving a request from a client to access a data segment associated with a file object of a storage system;
looking up an in-memory index for a first entry based on a fingerprint of the data segment, wherein the in-memory index includes a plurality of entries, each entry mapping the fingerprint of the data segment being contained in a log-structured container to a storage location of a solid state device (SSD) storing a corresponding data segment;

in the event a first entry is found, retrieving the data segment from the SSD based on the first entry;
in the event of a read failure while accessing the SSD, determining one or more failed data blocks of the SSD associated with the failure event; and
invalidating the failed data blocks of the SSD in response to determining the one or more failed data blocks, the invalidating of the failed data blocks of the SSD being recorded such that subsequent access to the failed data blocks are denied without having to accessing a corresponding SSD, wherein invalidating the failed data blocks comprises:
recording on a descriptive data block of the SSD, information of the failed data blocks of the SSD, such that subsequent read requests will check the descriptive data block for validity of requested data blocks, wherein the information of the failed data blocks include a table of entries recording a SSD device identifier (ID), a write-evict unit (WEU) ID identifying a WEU storing the requested data segment, and a block range or block size that corresponds to invalid blocks; and
propagating the recorded descriptive data block associated with the SSD to each disk volume of a plurality of disk volumes of the SSD, wherein each disk volume of the plurality of disk volumes of the SSD reserves the descriptive data block, such that each of the reserved descriptive data block includes a mirror image of the recorded descriptive data block having information of the failed data blocks of the SSD, each of the reserved descriptive data block marking an invalid disk volume of the plurality of disk volumes of the SSD.

9. The non-transitory machine-readable medium of claim 8, further comprising: propagating a copy of the descriptive data block in-memory such that validity of requested data blocks can be determined in-memory without accessing the SSD.

10. The non-transitory machine-readable medium of claim 8, further comprising:
in the event of a read failure, retrieving the requested data segment from a storage unit of the storage system; and
upon receiving the requested data segment form the storage unit, populating the SSD with the requested data segment.

11. The non-transitory machine-readable medium of claim 10, further comprising:
detecting a failure event while writing a new data segment to the SSD; and
in the event of a write failure, invalidating the data blocks of the SSD associated with the write request such that subsequent access to the failed data blocks are unavailable.

12. The non-transitory machine-readable medium of claim 11, further comprising:
writing the new data segment to a second SSD; and
updating the in-memory index to map the fingerprint of the new data segment to the second SSD, the fingerprint of the new data segment being contained in a log-structured container, the log-structured container being structured into a metadata section and a compression region section.

13. The non-transitory machine-readable medium of claim 8, wherein a failure of the cache memory device comprises: a checksum failure, a volume failure, a corruption, and a disk failure.

14. The non-transitory machine-readable medium of claim 8, further comprising:

upon detection of an event associated with a hot-plug of one of a plurality of individual SSDs, updating the descriptive data block of the SSD to remove information of failed data blocks associated with one or more disk volumes of the hot-plugged individual SSD.

15. A data processing system, comprising:
a processor; and
a memory coupled to the processor to store instructions, which when executed by the processor, cause the processor to perform operations, the operations including receiving a request from a client to access a data segment associated with a file object of a storage system;
looking up an in-memory index for a first entry based on a fingerprint of the data segment, wherein the in-memory index includes a plurality of entries, each entry mapping the fingerprint of the data segment being contained in a log-structured container to a storage location of a solid state device (SSD) storing a corresponding data segment;
in the event a first entry is found, retrieving the data segment from the SSD based on the first entry;
in the event of a read failure while accessing the SSD, determining one or more failed data blocks of the SSD associated with the failure event; and
invalidating the failed data blocks of the SSD in response to determining the one or more failed data blocks, the invalidating of the failed data blocks of the SSD being recorded such that subsequent access to the failed data blocks are denied without having to accessing a corresponding SSD, wherein invalidating the failed data blocks comprises:
recording on a descriptive data block of the SSD, information of the failed data blocks of the SSD, such that subsequent read requests will check the descriptive data block for validity of requested data blocks, wherein the information of the failed data blocks include a table of entries recording a SSD device identifier (ID), a write-evict unit (WEU) ID identifying a WEU storing the requested data segment, and a block range or block size that corresponds to invalid blocks; and
propagating the recorded descriptive data block associated with the SSD to each disk volume of a plurality of disk volumes of the SSD, wherein each disk volume of the plurality of disk volumes of the SSD reserves the descriptive data block, such that each of the reserved descriptive data block includes a mirror image of the recorded descriptive data block having information of the failed data blocks of the SSD, each of the reserved descriptive data block marking an invalid disk volume of the plurality of disk volumes of the SSD.

16. The data processing system of claim 15, further comprising: propagating a copy of the descriptive data block in-memory such that validity of requested data blocks can be determined in-memory without accessing the SSD.

17. The data processing system of claim 15, further comprising:
in the event of a read failure, retrieving the requested data segment from a storage unit of the storage system; and
upon receiving the requested data segment form the storage unit, populating the SSD with the requested data segment.

18. The data processing system of claim 17, further comprising:
detecting a failure event while writing a new data segment to the SSD; and
in the event of a write failure, invalidating the data blocks of the SSD associated with the write request such that subsequent access to the failed data blocks are unavailable.

* * * * *